(12) United States Patent
Miyatake

(10) Patent No.: US 9,116,568 B2
(45) Date of Patent: Aug. 25, 2015

(54) LIQUID CRYSTAL DISPLAY DEVICE

(71) Applicant: Masaki Miyatake, Konosu (JP)

(72) Inventor: Masaki Miyatake, Konosu (JP)

(73) Assignee: JAPAN DISPLAY INC., Tokyo (JP)

( * ) Notice: Subject to any disclaimer, the term of this patent is extended or adjusted under 35 U.S.C. 154(b) by 156 days.

(21) Appl. No.: 13/668,722

(22) Filed: Nov. 5, 2012

(65) Prior Publication Data

US 2013/0113780 A1 May 9, 2013

(30) Foreign Application Priority Data

Nov. 8, 2011 (JP) ................................. 2011-244527
Sep. 26, 2012 (JP) ................................. 2012-212143

(51) Int. Cl.
*G06F 3/041* (2006.01)
*G02F 1/1343* (2006.01)

(52) U.S. Cl.
CPC ........ *G06F 3/0412* (2013.01); *G02F 1/134336* (2013.01); *G06F 3/0418* (2013.01)

(58) Field of Classification Search
CPC  G02F 1/134336; G06F 3/0412; G06F 3/0418
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2003/0178551 A1* | 9/2003 | Ozawa ....................... | 250/208.1 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0309601 A1* | 12/2008 | Furukoshi ...................... | 345/89 |
| 2009/0033590 A1* | 2/2009 | Feng .............................. | 345/58 |
| 2009/0109202 A1* | 4/2009 | Kitagawa ..................... | 345/206 |
| 2010/0013815 A1* | 1/2010 | Kimura ........................ | 345/211 |
| 2010/0232004 A1* | 9/2010 | Hiroshima ................... | 359/259 |
| 2011/0285940 A1* | 11/2011 | Kubota et al. ................. | 349/86 |
| 2012/0105381 A1* | 5/2012 | Lee et al. ..................... | 345/176 |
| 2012/0119982 A1 | 5/2012 | Miyatake et al. | |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |

(Continued)

*Primary Examiner* — Aneeta Yodichkas
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a liquid crystal layer, and a common electrode. A first driving circuit and a second driving circuit output a scanning signal to a scanning line and alternately output a first auxiliary capacitive voltage and a second auxiliary capacitive voltage to a auxiliary capacitive line. A first switching circuit is connected to the first driving circuit and alternately switches between a first state and a second state. A second switching circuit is connected to the second driving circuit and alternately switches between the first state and the second state.

13 Claims, 19 Drawing Sheets

(56) References Cited

FOREIGN PATENT DOCUMENTS

| | | |
|---|---|---|
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |
| JP | 2010-113264 | 5/2010 |
| TW | 200942900 A * | 10/2009 |

* cited by examiner

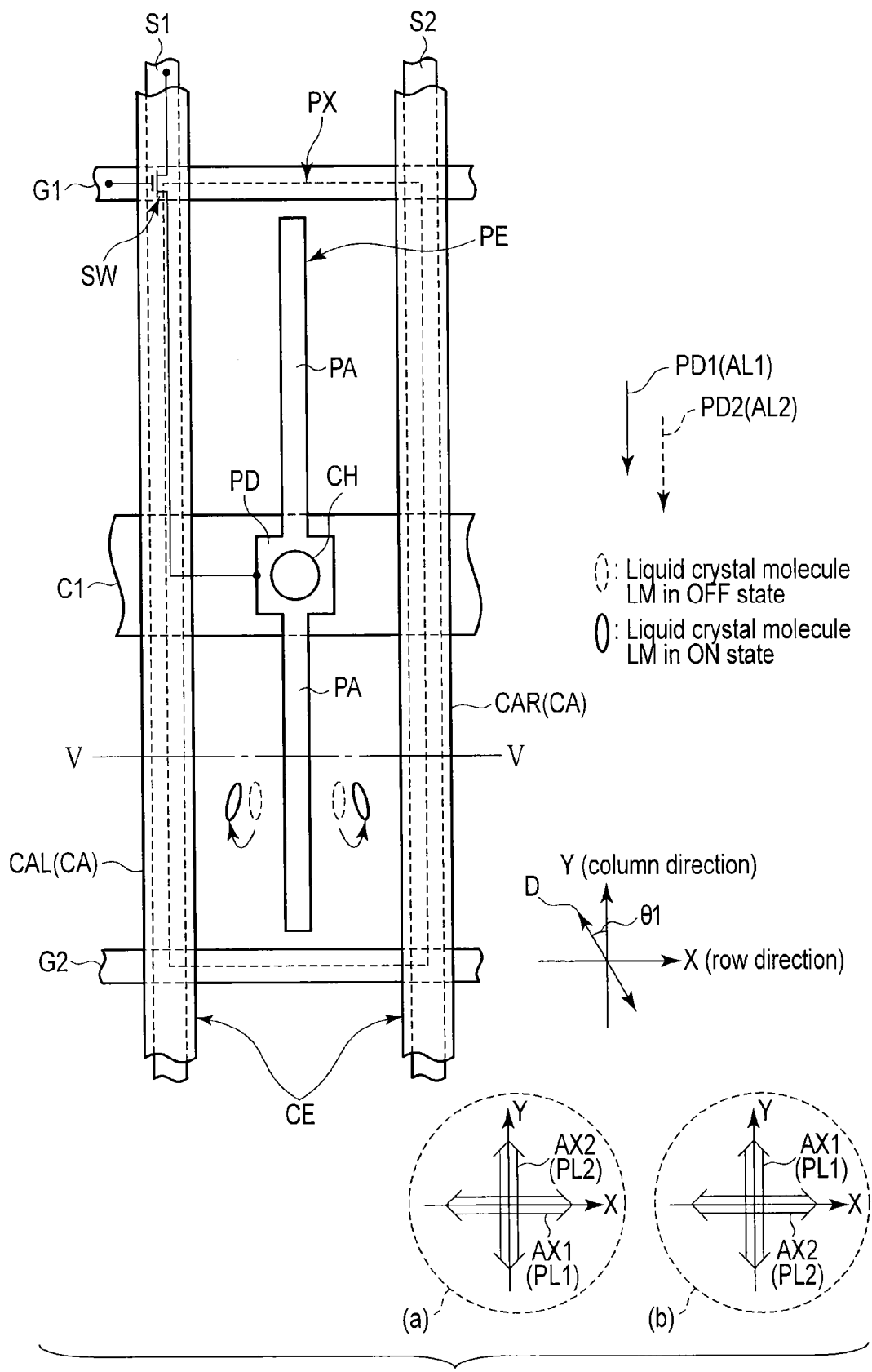
F I G. 4

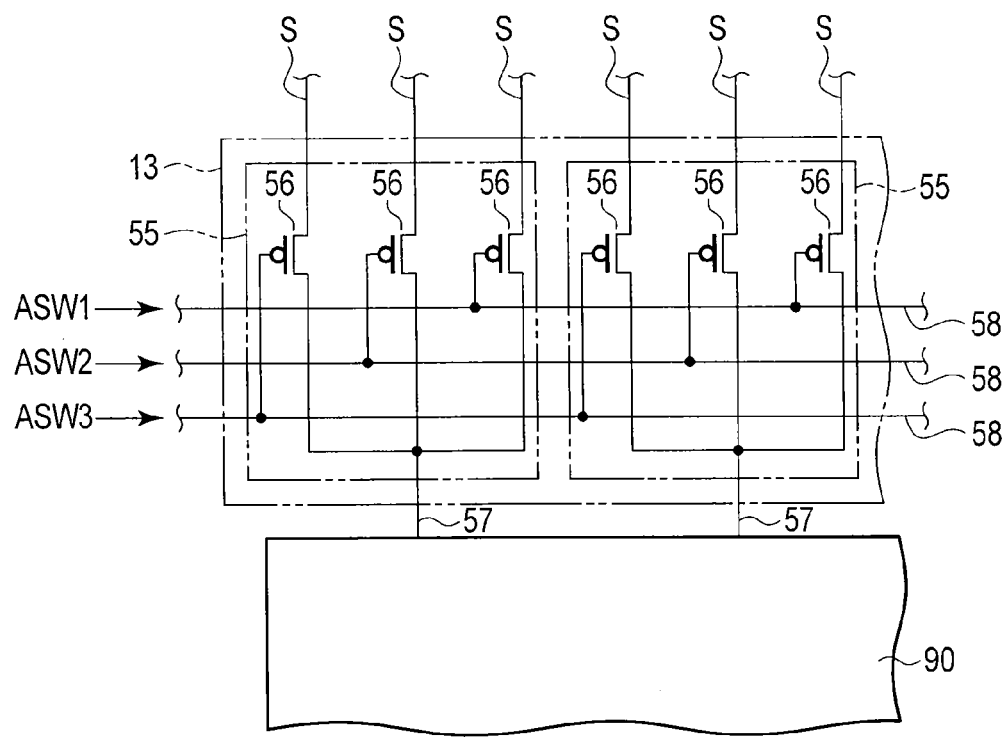
F I G. 7
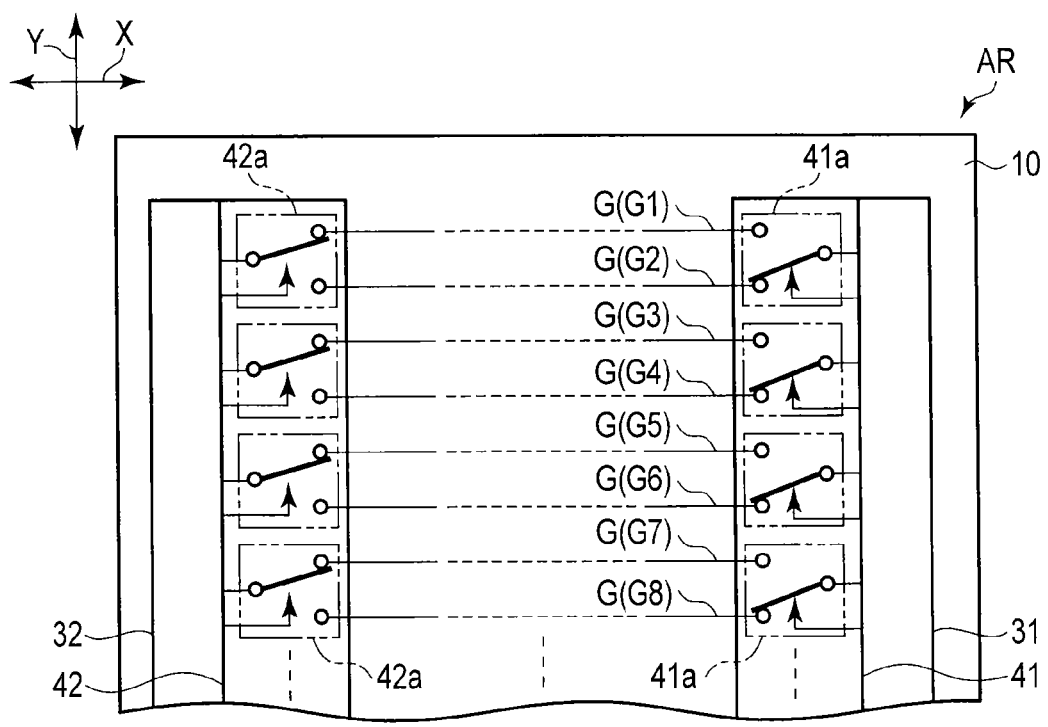
F I G. 8

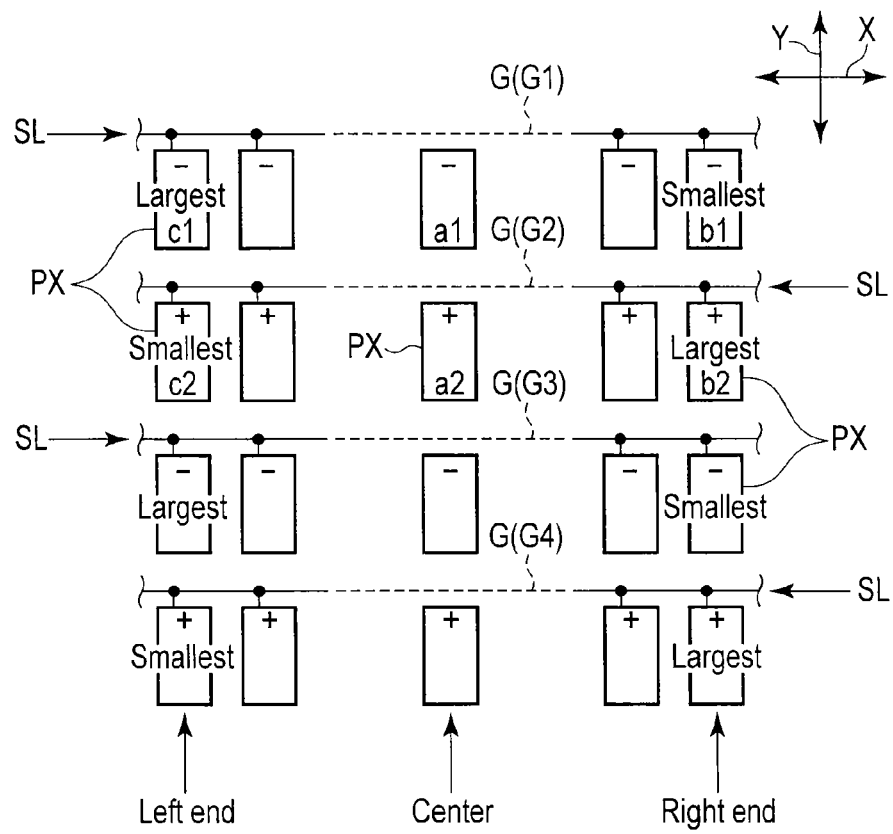
F I G. 9
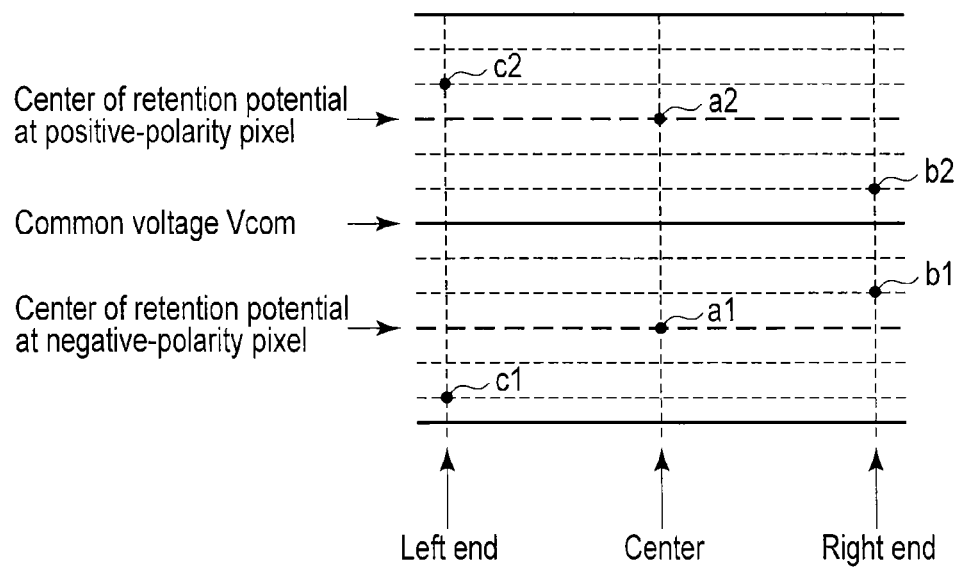
F I G. 10

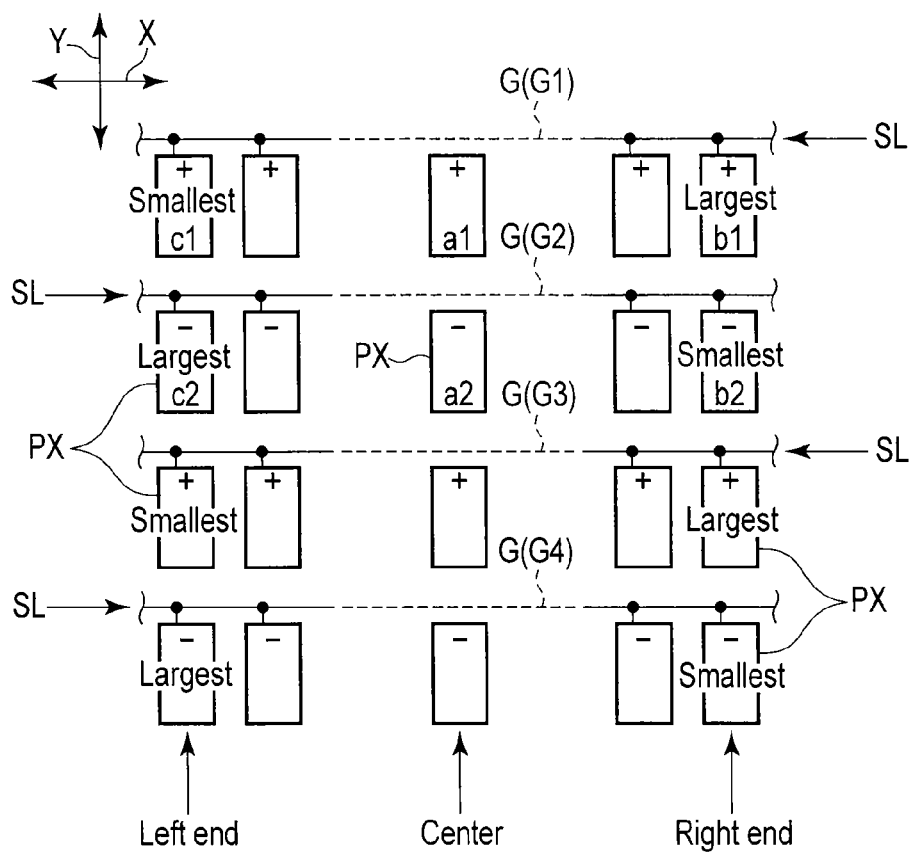
F I G. 15
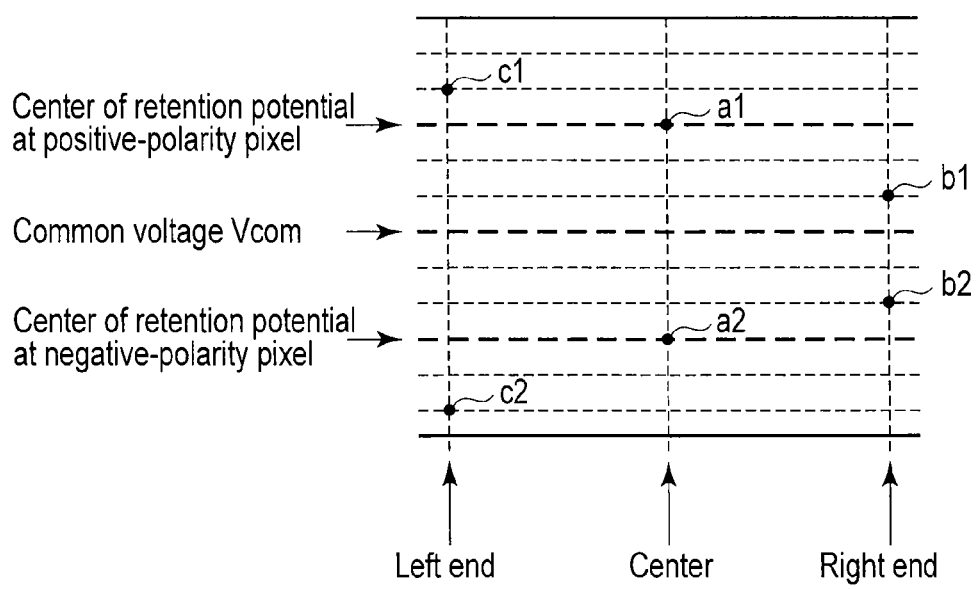
F I G. 16

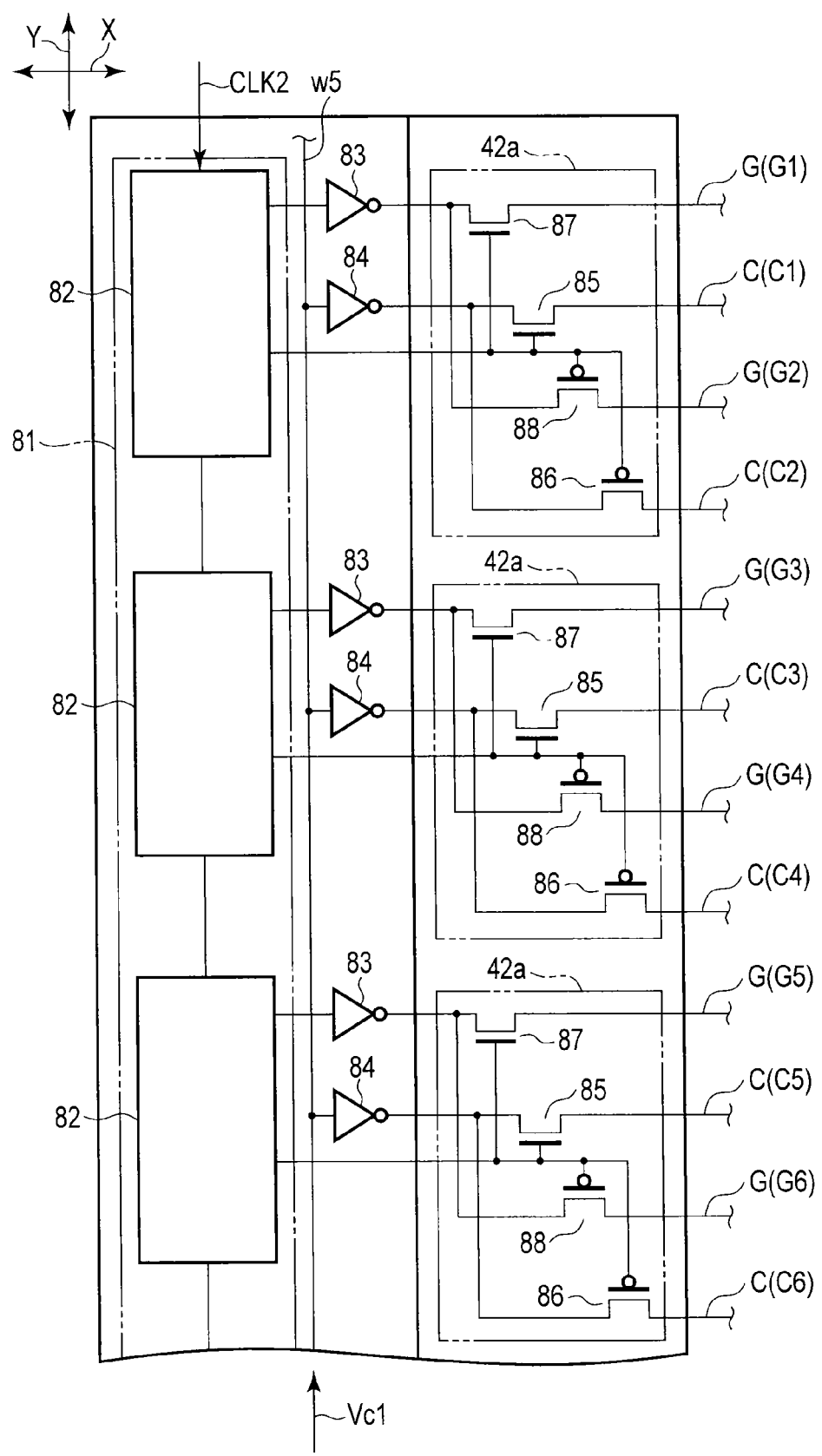
F I G. 18

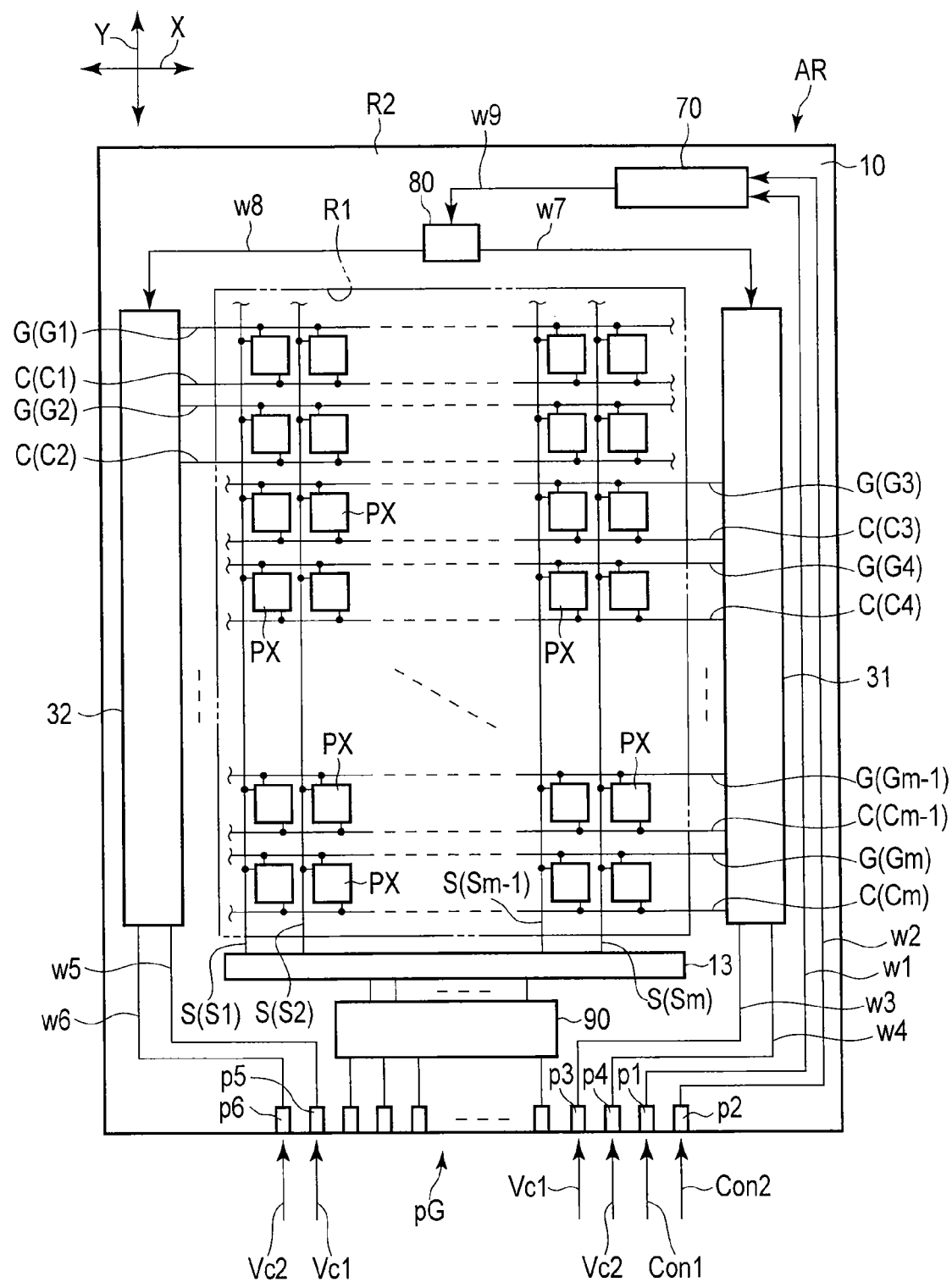
F I G. 19

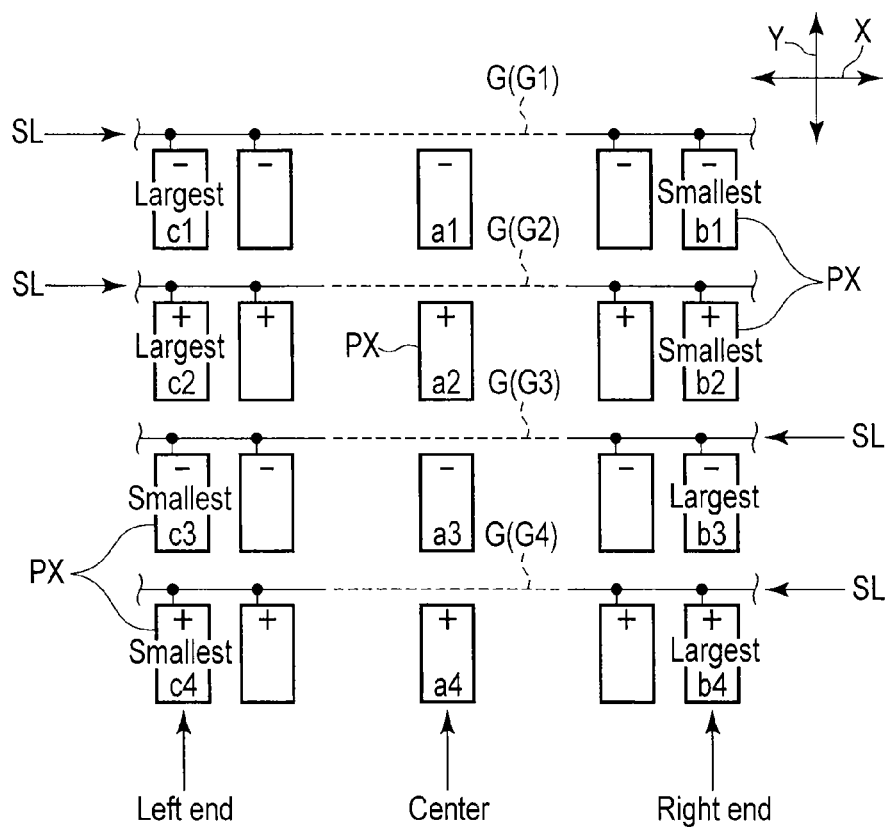
F I G. 22
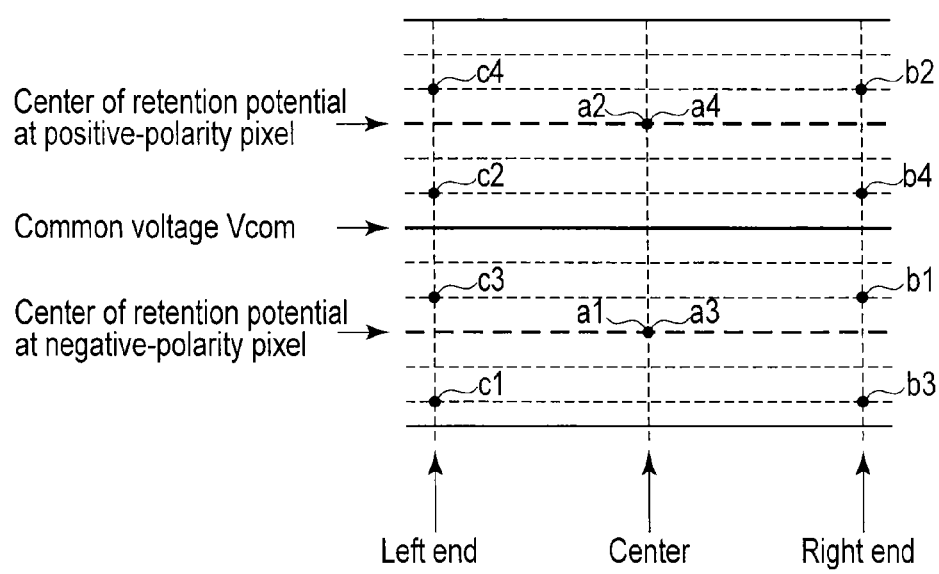
F I G. 23

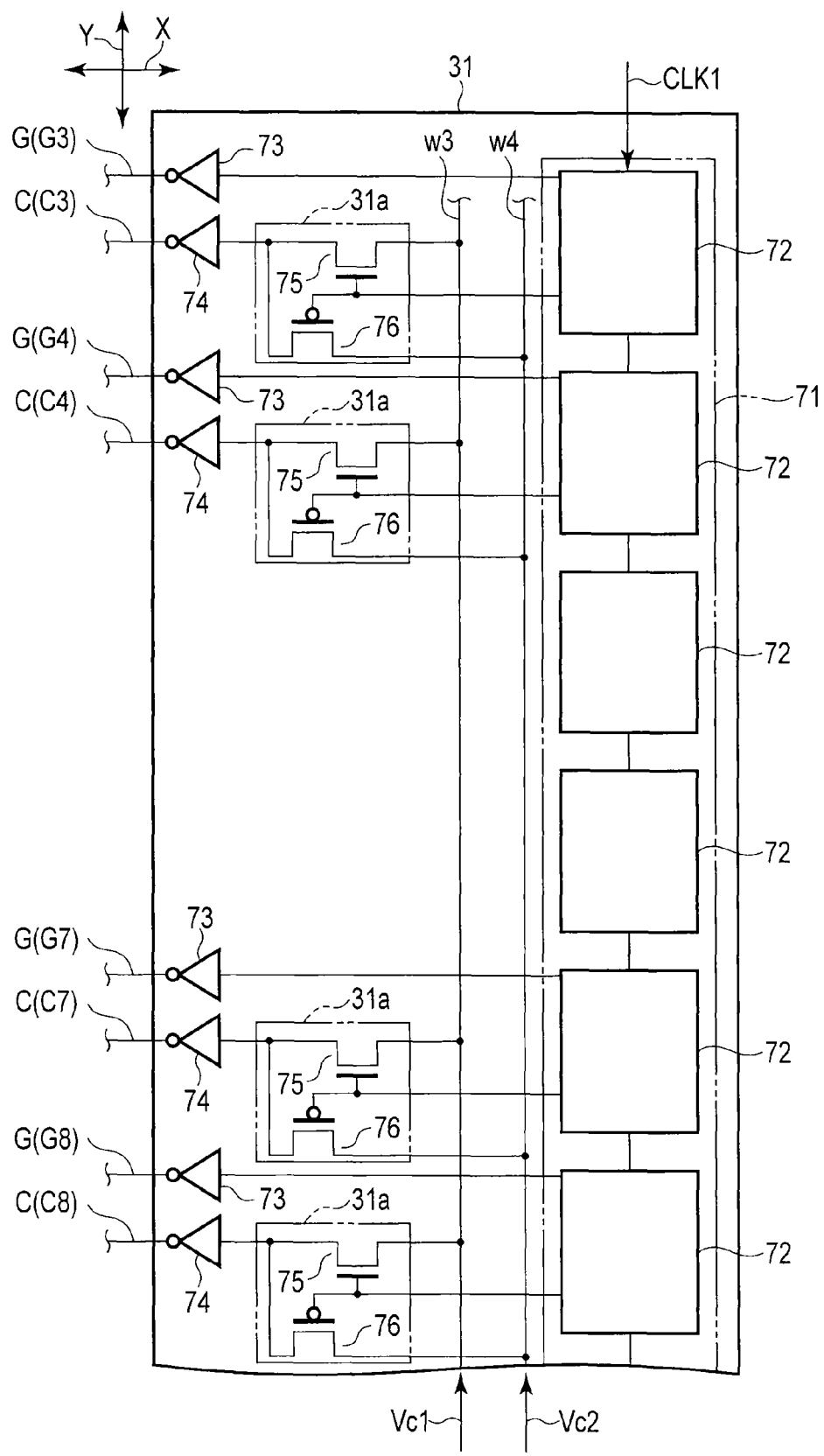
F I G. 24

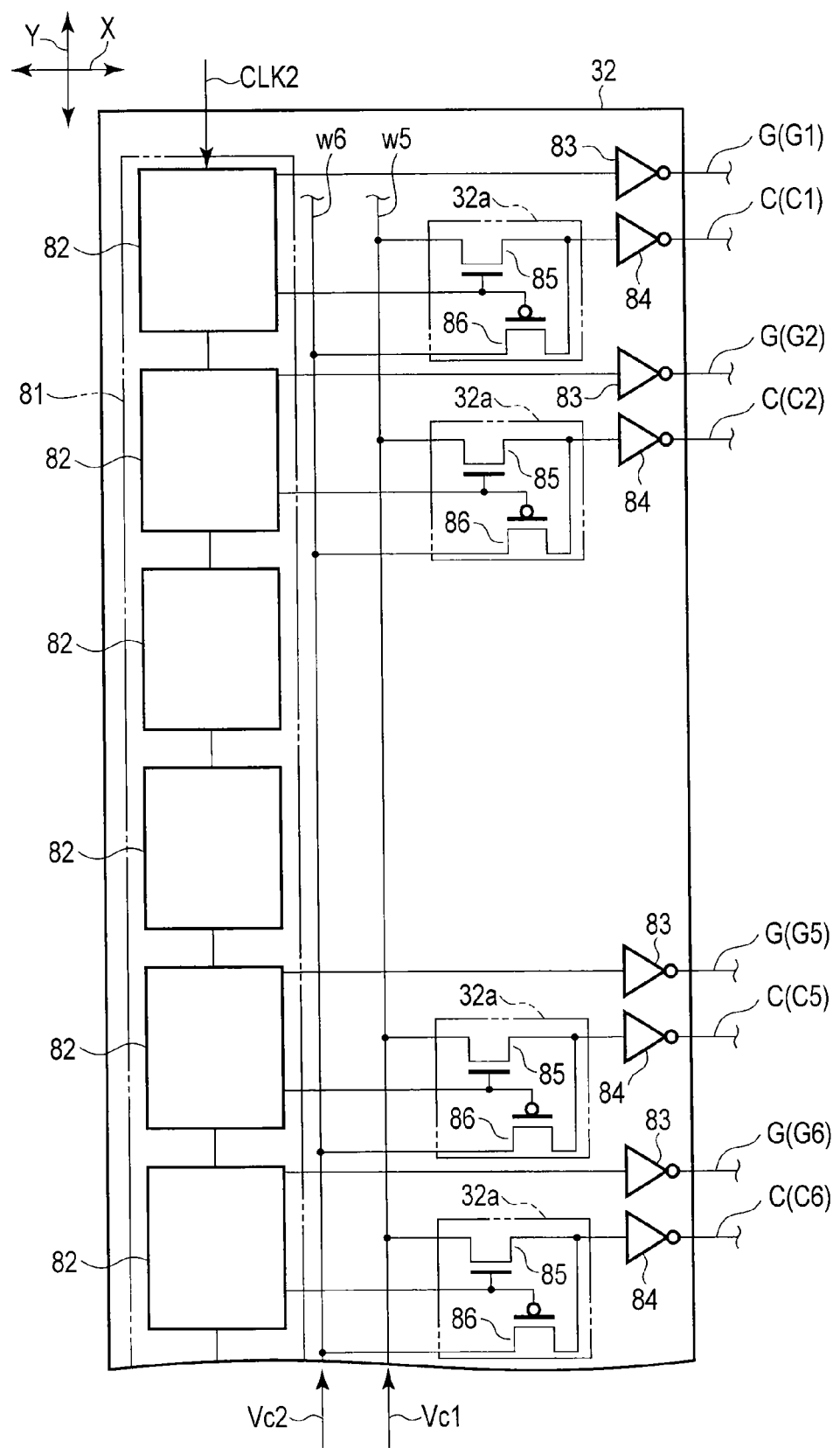
F I G. 25

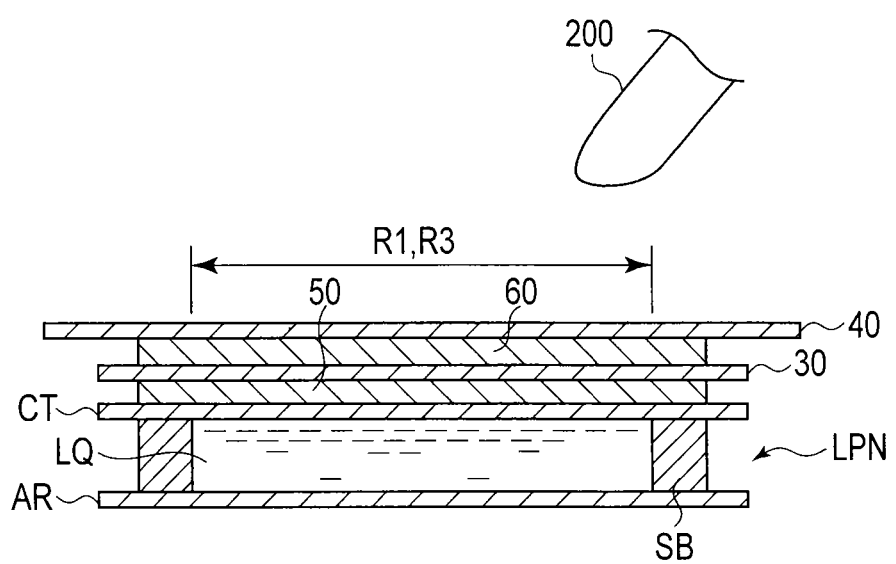
F I G. 27

LIQUID CRYSTAL DISPLAY DEVICE

CROSS-REFERENCE TO RELATED APPLICATIONS

This application is based upon and claims the benefit of priority from Japanese Patent Applications No. 2011-244527, filed Nov. 8, 2011; and No. 2012-212143, filed Sep. 26, 2012, the entire contents of all of which are incorporated herein by reference.

FIELD

Embodiments described herein relate generally to a liquid crystal display device.

BACKGROUND

Generally, a liquid crystal display device is used as an image display device. The liquid crystal display device is applied to displays of a mobile phone, a smartphone, a PDA (Personal Digital Assistant), and a personal computer by taking advantage of the display's low profile, light weight, and low power consumption. The liquid crystal display device includes an array substrate, a counter substrate that is arranged opposite to the array substrate, and a liquid crystal layer that is held between the array substrate and the counter substrate. Plural scanning lines, plural signal lines, plural auxiliary capacitive lines, plural pixel switching TFTs (Thin Film Transistors), and plural auxiliary capacitive elements are formed in the array substrate.

For the liquid crystal display device, there has been proposed conductively coupled driving (CC driving). In the CC driving, a potential at the auxiliary capacitive line is changed to provide a superimposed voltage to a pixel electrode through the auxiliary capacitive element. The use of the CC driving can reduce an amplitude (a voltage value) of a video signal provided to the signal line, allowing the reduction of the power consumption. Because the CC driving is a kind of polarity inversion driving, generation of immobilization of the liquid crystal (burn-in) can be prevented.

For the liquid crystal display device, there is also proposed dot inversion driving. The use of the dot inversion driving can reduce generation of a phenomenon called flicker in the liquid crystal display device, particularly in the high-quality liquid crystal display device. For the liquid crystal display device, there is also proposed conductively coupled dot inversion (CCDI) driving, in which the CC driving and the dot inversion driving are combined.

On the other hand, there is also proposed a technology of switching a liquid crystal molecule by forming a transverse electric field or an oblique electric field between the pixel electrode formed in the array substrate and a counter electrode formed in the counter substrate.

BRIEF DESCRIPTION OF THE DRAWINGS

FIG. 4 is a plan view schematically illustrating a structural example of a pixel when the liquid crystal display panel in FIG. 1 is viewed from a counter substrate side;

FIG. 7 is an enlarged plan view illustrating an outside of a display area of the array substrate, and is a circuit diagram illustrating a switching circuit;

FIG. 8 is a plan view illustrating a schematic configuration of part of the array substrate, and is a view illustrating a scanning line, a first driving circuit, a second driving circuit, a first switching circuit, and a second switching circuit;

FIG. 9 is a circuit diagram illustrating part of pixels and the scanning lines for any (k−1)th frame duration in the first embodiment, and is a view illustrating a polarity of the pixel, magnitude of a feed-through voltage of the pixel, and an input direction of the scanning signal;

FIG. 10 is a graph illustrating retention potentials at first-row and second-row pixels for any (k−1)th frame duration during halftone raster display in the first embodiment;

FIG. 15 is a circuit diagram illustrating part of the pixels and the scanning lines for any (k+2)th frame duration in the first embodiment, and is a view illustrating the polarity of the pixel, the magnitude of the feed-through voltage of the pixel, and the input direction of the scanning signal;

FIG. 16 is a graph illustrating the retention potentials at the first-row and second-row pixels for any (k+2)th frame duration during the halftone raster display in the first embodiment;

FIG. 18 is a circuit diagram in which the second driving circuit and the second switching circuit are partially enlarged;

FIG. 19 is a plan view illustrating a schematic configuration of an array substrate of a liquid crystal display device according to a second embodiment;

FIG. 22 is a circuit diagram illustrating part of the pixels and the scanning lines for any (k+1)th frame duration in the second embodiment, and is a view illustrating the polarity of the pixel, the magnitude of the feed-through voltage of the pixel, and the input direction of the scanning signal;

FIG. 23 is a graph illustrating the retention potentials at the first-row to fourth-row pixels for any (k+1)th frame duration during the halftone raster display in the second embodiment;

FIG. 24 is a circuit diagram in which a first driving circuit of the second embodiment is partially enlarged;

FIG. 25 is a circuit diagram in which a second driving circuit of the second embodiment is partially enlarged;

FIG. 27 is a sectional view schematically illustrating a liquid crystal display device according to a modification of the first and second embodiments.

DETAILED DESCRIPTION

Figure 1:
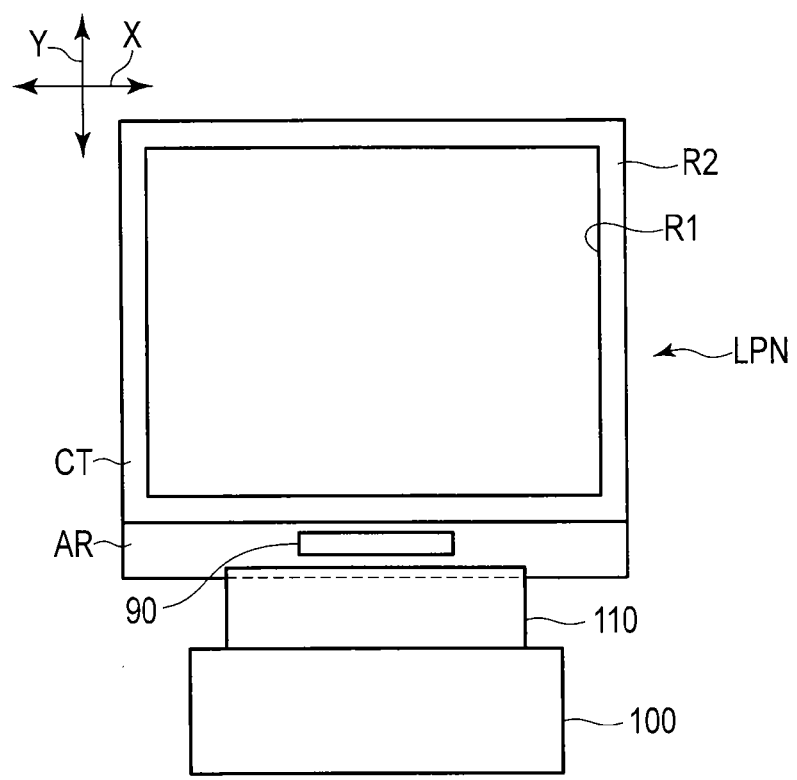
FIG. 1 is a view schematically illustrating a configuration and a circuit of a liquid crystal display device according to a first embodiment.

In general, according to one embodiment, there is provided a liquid crystal display device comprising: a first substrate including a plurality of signal lines that extend in a column direction, a plurality of scanning lines that extend in a row direction, a plurality of switching elements that are electrically connected to the signal lines and the scanning lines, a plurality of auxiliary capacitive elements that are electrically connected to the switching elements, a plurality of auxiliary capacitive lines each of which extends in the row direction and is electrically connected to one end of the auxiliary capacitive element, a plurality of pixel electrodes each of which is electrically connected to the switching element and the other end of the auxiliary capacitive element, a first driving circuit and a second driving circuit that output a scanning signal to the scanning line and alternately output a first auxiliary capacitive voltage and a second auxiliary capacitive voltage to the auxiliary capacitive line, a first switching circuit that is connected to the first driving circuit to alternately switch between a first state and a second state in each predetermined frame duration, the first switching circuit being connected to the (2L−1)th-row scanning lines and the (2L−1)th-row auxiliary capacitive lines in the first state, the first switching circuit being connected to the 2Lth-row scanning lines and the 2Lth-row auxiliary capacitive lines in the second state, and a second switching circuit that is connected to the second driving circuit to alternately switch between the first state and the second state in each predetermined frame duration; a second substrate that is arranged opposite to the first substrate with a gap; a liquid crystal layer that is held between the first substrate and the second substrate; and a common electrode that is formed on the first substrate or the second substrate and set to a common voltage of a constant voltage.

According to another embodiment, there is provided a liquid crystal display device comprising: a first substrate including a plurality of signal lines that extend in a column direction, a plurality of scanning lines that extend in a row direction, a plurality of switching elements that are electrically connected to the signal lines and the scanning lines, a plurality of auxiliary capacitive elements that are electrically connected to the switching elements, a plurality of auxiliary capacitive lines each of which extends in the row direction and is electrically connected to one end of the auxiliary capacitive element, a plurality of pixel electrodes each of which is electrically connected to the switching element and the other end of the auxiliary capacitive element, a first driving circuit that provides a scanning signal to the (4L−1)th and 4Lth-row scanning lines and outputs a first auxiliary capacitive voltage and a second auxiliary capacitive voltage, a second driving circuit that provides the scanning signal to the (4L−3)th-row and (4L−2)th-row scanning lines and outputs the first auxiliary capacitive voltage and the second auxiliary capacitive voltage, a first switching circuit that is connected to the first driving circuit and the (4L−1)th-row and 4Lth-row auxiliary capacitive lines, and a second switching circuit that is connected to the second driving circuit and the (4L−3)th-row and (4L−2)th-row auxiliary capacitive lines; a second substrate that is arranged opposite to the first substrate with a gap; a liquid crystal layer that is held between the first substrate and the second substrate; and a common electrode that is formed on the first substrate or the second substrate and set to a common voltage of a constant voltage, wherein during a kth frame duration, the first switching circuit provides the first auxiliary capacitive voltage to the (4L−1)th-row auxiliary capacitive lines and provides the second auxiliary capacitive voltage to the 4Lth-row auxiliary capacitive lines, and the second switching circuit provides the first auxiliary capacitive voltage to the (4L−3)th-row auxiliary capacitive lines and provides the second auxiliary capacitive voltage to the (4L−2)th-row auxiliary capacitive lines, and during a (k+1)th frame duration, the first switching circuit provides the second auxiliary capacitive voltage to the (4L−1)th-row auxiliary capacitive lines and provides the first auxiliary capacitive voltage to the 4Lth auxiliary capacitive lines, and the second switching circuit provides the second auxiliary capacitive voltage to the (4L−3)th-row auxiliary capacitive lines and provides the first auxiliary capacitive voltage to the (4L−2)th auxiliary capacitive lines.

According to still another embodiment, there is provided a liquid crystal display device comprising: a first substrate including a plurality of signal lines that extend in a column direction, a plurality of scanning lines that extend in a row direction, a plurality of switching elements that are electrically connected to the signal lines and the scanning lines, a plurality of auxiliary capacitive elements that are electrically connected to the switching elements, a plurality of auxiliary capacitive lines each of which extends in the row direction and is electrically connected to one end of the auxiliary capacitive element, a plurality of pixel electrodes each of which is electrically connected to the switching element and the other end of the auxiliary capacitive element, a first driving circuit and a second driving circuit that output a scanning signal to the scanning line and alternately output a first auxiliary capacitive voltage and a second auxiliary capacitive voltage to the auxiliary capacitive line, a first switching circuit that is connected to the first driving circuit to alternately switch between a first state and a second state in each predetermined frame duration, the first switching circuit being connected to the (2L−1)th-row scanning lines and the (2L−1)th-row auxiliary capacitive lines in the first state, the first switching circuit being connected to the 2Lth-row scanning lines and the 2Lth-row auxiliary capacitive lines in the second state, and a second switching circuit that is connected to the second driving circuit to alternately switch between the first state and the second state in each predetermined frame duration; a second substrate that is arranged opposite to the first substrate with a gap; a liquid crystal layer that is held between the first substrate and the second substrate; and a common electrode that is formed on the first substrate or the second substrate and set to a common voltage of a constant voltage, wherein each of the pixel electrodes includes a primary pixel electrode that extends in the column direction, and the common electrode includes a plurality of primary common electrodes, each of which is formed on the second substrate, located in the row direction while the primary pixel electrode is sandwiched therebetween, and extends in the column direction.

Figure 3:
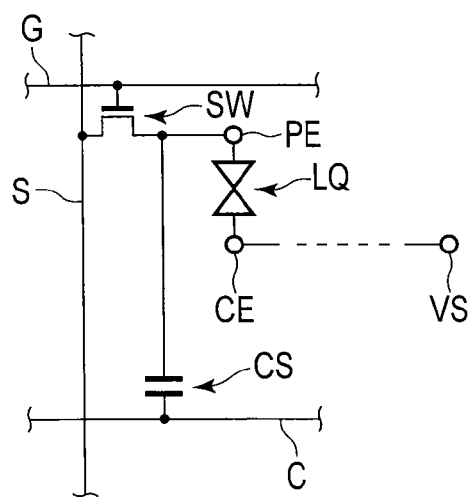
FIG. 3 is an equivalent circuit diagram illustrating a pixel in FIG. 2.
Figure 2:
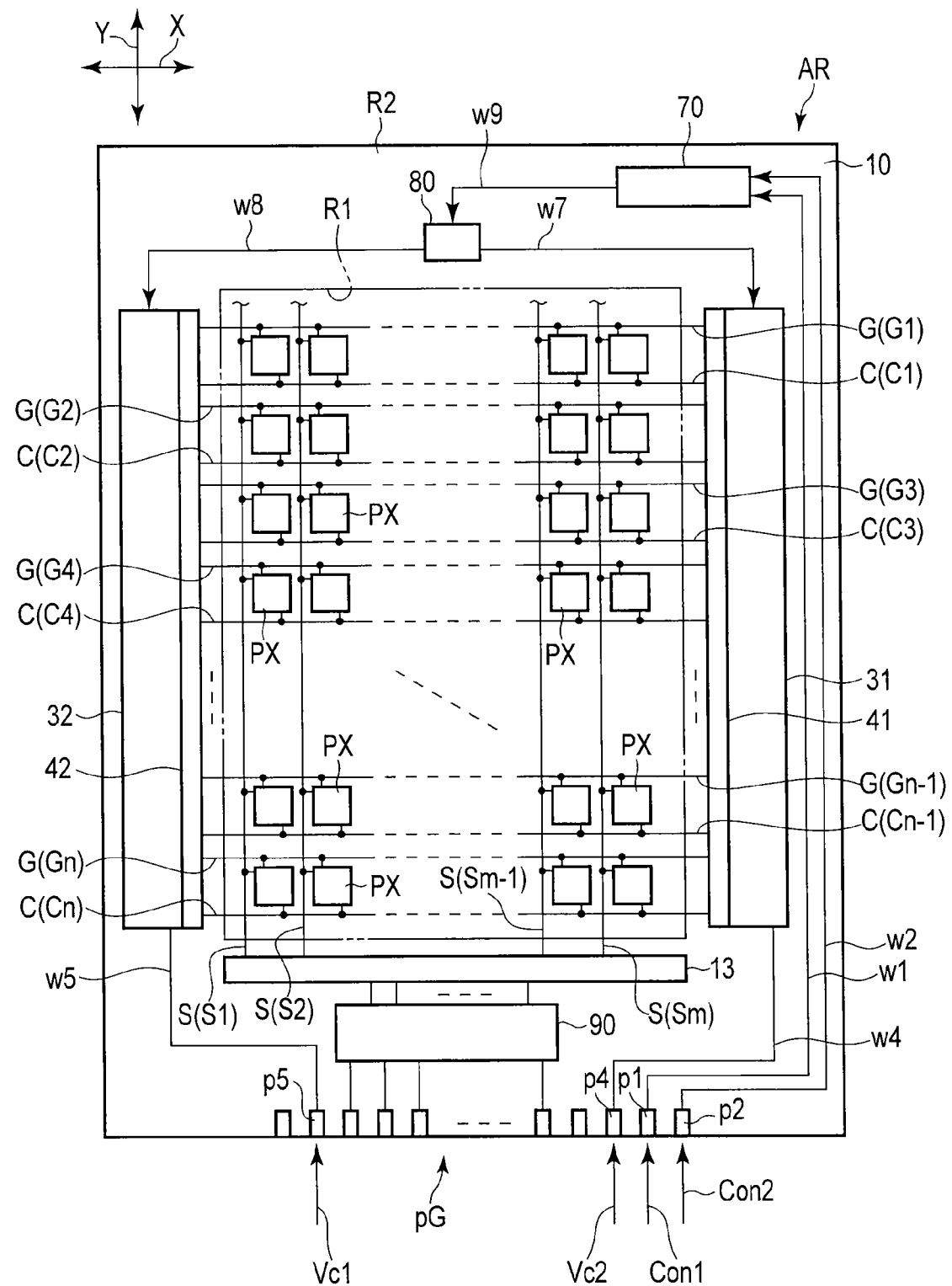
FIG. 2 is a plan view illustrating a schematic configuration of an array substrate in FIG. 1.

Hereinafter, a liquid crystal display device according to a first embodiment will be described in detail with reference to the drawings. FIG. 1 is a view schematically illustrating a configuration and a circuit of the liquid crystal display device of the first embodiment. FIG. 2 is a plan view illustrating a schematic configuration of an array substrate AR in FIG. 1. FIG. 3 is an equivalent circuit diagram illustrating a pixel PX in FIG. 2.

As illustrated in FIGS. 1 to 3, the liquid crystal display device includes an active matrix type liquid crystal display panel LPN. The liquid crystal display panel LPN includes the array substrate AR that is of the first substrate, a counter substrate CT that is of the second substrate, which is arranged opposite to the array substrate AR with a predetermined gap, and a liquid crystal layer LQ that is held between the array substrate AR and the counter substrate CT. The liquid crystal display device also includes a signal line driving circuit 90 that is of a video signal output unit, a controller 100, and an FPC (flexible printed circuit) 110. The liquid crystal display panel LPN includes a display area R1 where the image is displayed.

The display area R1 opposes the array substrate AR, the counter substrate CT, and the liquid crystal layer LQ. In the display area R1, the plural pixels PX are located between the array substrate AR and the counter substrate CT. The m-by-n pixels PX are two-dimensionally provided in a column direction Y and a row direction X (where m and n are positive integers).

A switching circuit 13, a first driving circuit 31, a second driving circuit 32, a first switching circuit 41, a second switching circuit 42, and a pad group (hereinafter referred to as an OLB pad group) pG for outer lead bonding are formed on the side of the array substrate AR in a non-display area R2 outside the display area R1. In the first embodiment, the first driving circuit 31, the second driving circuit 32, the first switching circuit 41, and the second switching circuit 42 act as a scanning line driving circuit and an auxiliary capacitive line driving circuit.

In the display area R1, the liquid crystal display panel LPN includes n scanning lines G (G1 to Gn), n auxiliary capacitive lines C (C1 to Cn), and m signal lines S (S1 to Sm). For example, the scanning lines G and the auxiliary capacitive lines C extend substantially linearly in the row direction X. The scanning lines G and the auxiliary capacitive lines C are alternately disposed in parallel in the column direction Y intersecting the row direction X. At this point, the row direction X and the column direction Y are substantially orthogonal to each other.

The signal lines S intersect the scanning lines G and the auxiliary capacitive lines C. The signal lines S extend substantially linearly in the column direction Y. The scanning lines G, the auxiliary capacitive lines C, and the signal line S may not necessarily extend linearly, but may be partially be bent. The scanning lines G, the auxiliary capacitive lines C, and the signal lines S are extracted to the outside of the display area R1.

Each pixel PX includes a switching element SW, a pixel electrode PE, and a common electrode CE. For example, a retention capacity CS is formed between the auxiliary capacitive line C and the pixel electrode PE, which is arranged opposite to the auxiliary capacitive line C with an insulating film interposed therebetween. In this case, the auxiliary capacitive line C and the pixel electrode PE constitute the auxiliary capacitive element.

Alternatively, the retention capacity CS is formed between the auxiliary capacitive line C and an auxiliary capacitive electrode (not illustrated), which is arranged opposite to the auxiliary capacitive line C with the insulating film interposed therebetween and connected to the pixel electrode PE. In this case, the auxiliary capacitive line C and the auxiliary capacitive electrode constitute the auxiliary capacitive element.

In the first embodiment, the liquid crystal display panel LPN has the configuration in which at least part of the common electrode CE is formed in the counter substrate CT while the pixel electrode PE is formed in the array substrate AR, and liquid crystal molecules in the liquid crystal layer LQ are switched by mainly utilizing an electric field formed between the pixel electrode PE and the common electrode CE. The electric field formed between the pixel electrode PE and the common electrode CE is an oblique electric field that is slightly inclined with respect to an X-Y plane defined by the row direction X and the column direction Y or a substrate principal surface (or a transverse electric field substantially parallel to the substrate principal surface).

For example, the switching element SW is constructed by an n-channel thin film transistor (TFT). The switching element SW is electrically connected to the scanning line G and the signal line S. The switching element SW may be either a top-gate type TFT or a bottom gate type TFT. For example, a semiconductor layer of the switching element SW is made of polysilicon. Alternatively, the semiconductor layer may be made of amorphous silicon.

The pixel electrode PE is disposed in each pixel PX and electrically connected to the switching element SW. The common electrode CE is commonly disposed with respect to the pixel electrodes PE of the pixels PX through the liquid crystal layer LQ. For example, the pixel electrode PE and the common electrode CE are made of conductive materials, such as indium tin oxide (ITO) and indium zinc oxide (IZO), which have an optically transparent property. Alternatively, the pixel electrode PE and the common electrode CE may be made of other metallic materials, such as aluminum.

The array substrate AR includes a power feeding unit VS that applies a voltage (common voltage) to the common electrode CE. For example, the power feeding unit VS is formed in the non-display area R2. The common electrode CE is extracted to the outside of the display area R1 and electrically connected to the power feeding unit VS through a conductive member (not illustrated).

FIG. 4 is a plan view schematically illustrating a structural example of one pixel PX when the liquid crystal display panel LPN in FIG. 1 is viewed from the side of the counter substrate CT. FIG. 4 is the plan view in the X-Y plane.

As illustrated in FIG. 4, the pixel PX has, as indicated by a dashed line, a rectangular shape in which a length in the row direction X is shorter than a length in the column direction Y. In the first embodiment, the pixel PX has a long axis parallel to the column direction Y. However, the pixel PX is not limited to the first embodiment, but the pixel PX may have the long axis parallel to the column direction Y or the row direction X.

The scanning lines G1 and G2 extend in the row direction X. The auxiliary capacitive line C1 is disposed between the scanning lines G1 and G2 adjacent to each other, and extends in the row direction X. The signal lines S1 and S2 extend in the column direction Y. The pixel electrode PE is disposed between the signal lines S1 and S2 adjacent to each other. The pixel electrode PE is also located between the scanning lines G1 and G2.

In the illustrated example, the signal line S1 is disposed in a left end portion of pixel PX, and the signal line S2 is disposed in a right end portion of pixel PX. Strictly speaking, the signal line S1 is disposed across a boundary between the pixel PX and the pixel on the left side, and the signal line S2 is disposed across a boundary between the pixel PX and the pixel on the right side. In the pixel PX, the scanning line G1 is disposed in an upper end portion, and the scanning line G2 is disposed in a lower end portion. Strictly speaking, the scanning line G1 is disposed across a boundary between the pixel PX and the pixel on the upper side, and the scanning line G2 is disposed across a boundary between the pixel PX and the pixel on the lower side. The auxiliary capacitive line C1 is disposed in a substantially central portion of the pixel.

In the illustrated example, the switching element SW is electrically connected to the scanning line G1 and the signal line S1. The switching element SW is provided at an intersection of the scanning line G1 and the signal line S1. A drain wiring of the switching element SW extends along the signal line S1 and the auxiliary capacitive line C1, and is electrically connected to the pixel electrode PE through a contact hole CH that is formed in a region opposing the auxiliary capacitive line C1. The switching element SW is provided in a region that opposes the signal line S1 and the auxiliary capacitive line C1, and the switching element SW suppresses reduction of an area of an aperture contributing to the display while hardly running over the signal line S1 and the auxiliary capacitive line C1.

The plural pixel electrodes PE are arrayed at intervals in the row direction X and the column direction Y. Each pixel electrode PE includes a primary pixel electrode PA extending in a direction along the long axis of the pixel PX. In the first embodiment, the primary pixel electrode PA is formed while extending in the column direction Y.

In the first embodiment, the pixel electrode PE includes the primary pixel electrode PA and a contact PC, which are electrically connected to each other. The primary pixel electrode PA extends linearly in the column direction Y from the contact PC to a neighborhood of the upper end portion of the pixel PX and a neighborhood of the lower end portion of the pixel PX. The primary pixel electrode PA is formed into a belt shape having the substantially same width in the row direction X. The contact PC is located in the region opposing the auxiliary capacitive line C1, and electrically connected to the switching element SW through the contact hole CH. The contact PC is formed wider than the primary pixel electrode PA.

The pixel electrode PE is disposed at a substantially middle position between the signal line S1 and the signal line S2, namely, in the center of the pixel PX. An interval between the signal line S1 and the pixel electrode PE in the row direction X is substantially equal to an interval between the signal line S2 and the pixel electrode PE in the row direction X.

The common electrode CE includes plural primary common electrodes CA formed on the side of the counter substrate CT. The pair of primary common electrodes CA is located in the direction orthogonal to the long axis of the pixel PX while the primary pixel electrode PA is sandwiched therebetween, and the primary common electrodes CA extend in the direction along the long axis of the pixel PX.

In the first embodiment, the plural primary common electrodes CA are arrayed at intervals in the row direction X in the X-Y plane, the plural primary pixel electrodes PA are sandwiched between the primary common electrodes CA in the row direction X, and the primary common electrode CA extends linearly in the column direction Y substantially parallel to the primary pixel electrode PA. The primary common electrode CA faces the signal line S, and extends substantially parallel to the primary pixel electrode PA. The primary common electrode CA is formed into the belt shape having the substantially same width in the row direction X.

In the example in FIG. 4, the two primary common electrodes CA are parallel to each other in the row direction X, and disposed in the right and left end portions of the pixel PX, respectively. In order to distinguish the primary common electrodes CA from each other, the primary common electrode on the left side in FIG. 4 is referred to as CAL, and the primary common electrode on the right side is referred to as CAR. The primary common electrode CAL faces the signal line S1, and the primary common electrode CAR faces the signal line S2.

In the pixel PX, the primary common electrode CAL is disposed in the left end portion, and the primary common electrode CAR is disposed in the right end portion. Strictly speaking, the primary common electrode CAL is disposed across the boundary between the pixel PX and the pixel on the left side, and the primary common electrode CAR is disposed across the boundary between the pixel PX and the pixel on the right side.

As to a positional relationship between the pixel electrode PE and the primary common electrode CA, the pixel electrodes PE and the primary common electrodes CA are alternately disposed in the row direction X. The pixel electrode PE and the primary common electrode CA are disposed substantially in parallel to each other. At this point, in the X-Y plane, no primary common electrodes CA overlap the pixel electrode PE.

That is, the pixel electrode PE is located between the primary common electrodes CAL and CAR adjacent to each other. In other words, the pair of primary common electrodes (the primary common electrode CAL and the primary common electrode CAR) is disposed on both sides between which the position immediately above the pixel electrode PE is sandwiched. As described above, the pixel electrode PE is disposed between the primary common electrode CAL and the primary common electrode CAR. Therefore, the primary common electrode CAL, the primary pixel electrode PA, and the primary common electrode CAR are disposed in this order in the row direction X.

The interval between the pixel electrode PE and the common electrode CE in the row direction X is substantially kept constant. That is, the interval between the primary common electrode CAL and the primary pixel electrode PA in the row direction X is substantially equal to the interval between the primary common electrode CAR and the primary pixel electrode PA in the row direction X.

Figure 5:
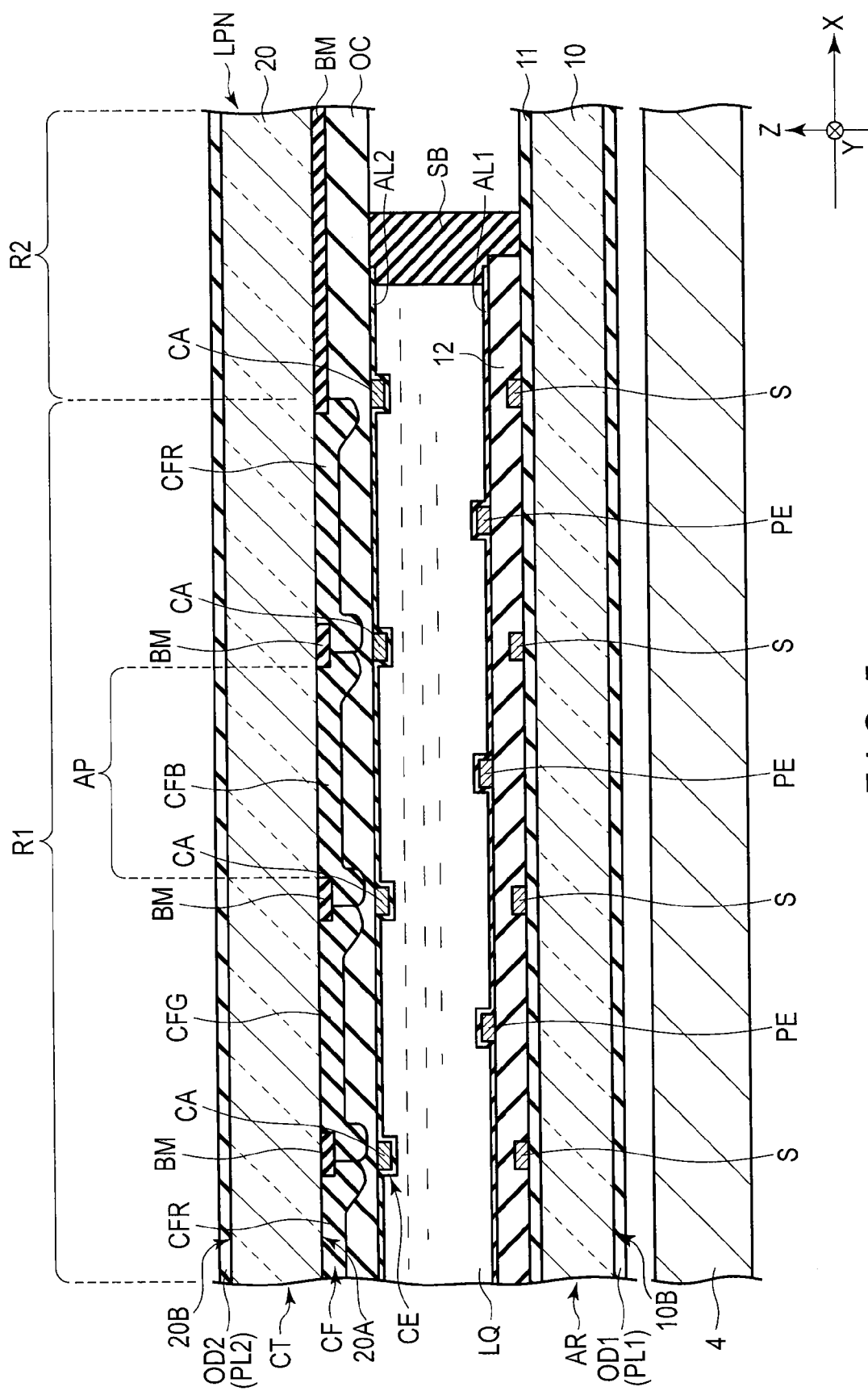
FIG. 5 is a sectional view schematically illustrating a sectional structure of the liquid crystal display panel in FIG. 4 along a line V-V.

FIG. 5 is a sectional view schematically illustrating a sectional structure of the liquid crystal display panel LPN in FIG. 4 along a line V-V. Only the components necessary for the description are illustrated in FIG. 5.

As illustrated in FIG. 5, a backlight unit 4 is disposed on a rear surface side of the array substrate AR constituting the liquid crystal display panel LPN. Various kinds of backlight units can be used as the backlight unit 4, and a backlight unit in which a light emitting diode (LED) is used as a light source or a backlight unit in which a cold cathode fluorescent tube (CCFL) is used can be used as the backlight unit 4, and the detailed description of the structure of the backlight unit 4 is omitted.

The array substrate AR is constructed by a first insulating substrate 10 having the optically transparent property. The signal line S is formed on a first interlayer insulating film 11, and covered with a second interlayer insulating film 12. For example, the scanning line (not illustrated) and the auxiliary capacitive line (not illustrated) are disposed between the first insulating substrate 10 and the first interlayer insulating film 11. The pixel electrode PE is formed on the second interlayer insulating film 12. The pixel electrode PE is located inside the position immediately above the adjacent signal line S.

A first alignment film AL1 is disposed in a surface facing the counter substrate CT of the array substrate AR, and extends over the substantially whole display area R1. The first alignment film AL1 covers the pixel electrode PE, and is also displayed on the second interlayer insulating film 12. In the first embodiment, the first alignment film AL1 is made of a material exerting a horizontal orientation. The array substrate AR may include part of the common electrode CE.

The counter substrate CT is constructed by a second insulating substrate 20 having the optically transparent property. The counter substrate CT includes a black matrix BM, a color filter CF, an overcoat layer OC, a common electrode CE, and a second alignment film AL2.

The black matrix BM partitions the pixels PX to form an aperture AP facing the pixel electrode PE. That is, the black matrix BM is disposed so as to face wiring portions such as the signal line S, the scanning line, the auxiliary capacitive line, and the switching element. Although only the portion extending in the column direction Y is illustrated in the black matrix BM in FIG. 6, the black matrix BM may include a portion extending in the row direction X. The black matrix BM is disposed in an inner surface 20A facing the array substrate AR of the second insulating substrate 20.

The color filter CF is disposed according to each pixel PX. That is, the color filter CF is disposed in the aperture AP in the inner surface 20A of the second insulating substrate 20, and part of the color filter CF runs on the black matrix BM. The color filters CF disposed in the pixels PX adjacent to each other in the row direction X have different colors. For example, the color filter CF is made of a resin material that is colored in each of three primary colors of red, blue, and green. A red color filter CFR made of the resin material colored in red is disposed according to the red pixel. A blue color filter CFB made of the resin material colored in blue is disposed according to the blue pixel. A green color filter CFG made of the resin material colored in green is disposed according to the green pixel. A boundary between the color filters CF is located so as to overlap the black matrix BM.

The overcoat layer OC covers the color filter CF. The overcoat layer OC relaxes an influence of surface irregularity of the color filter CF.

The common electrode CE is formed on the side facing the array substrate AR of the overcoat layer OC. The interval between the common electrode CE and the pixel electrode PE in a perpendicular direction Z is substantially kept constant. As used herein, the perpendicular direction Z means a direction orthogonal to the row direction X and the column direction Y or a direction normal to the liquid crystal display panel LPN.

The second alignment film AL2 is disposed in the surface facing the array substrate AR of the counter substrate CT, and extends over the substantially whole display area R1. The second alignment film AL2 covers the common electrode CE and the overcoat layer OC. In the first embodiment, the second alignment film AL2 is made of a material exerting the orientation.

An alignment treatment (for example, rubbing or an optical alignment treatment) is performed to the first alignment film AL1 and the second alignment film AL2 in order to initially orient the liquid crystal molecule of the liquid crystal layer LQ. A first alignment treatment direction PD1 in which the first alignment film AL1 initially orients the liquid crystal molecule and a second alignment treatment direction PD2 in which the second alignment film AL2 initially orients the liquid crystal molecule are parallel to each other, and are the reverse directions or the same direction. For example, as illustrated in FIG. 2, the first and second alignment treatment directions PD1 and PD2 are substantially parallel to the column direction Y, and are the same direction.

In the first embodiment, the first and second alignment films AL1 and AL2 can initially orient the liquid crystal molecules near the first and second alignment films AL1 and AL2 in the column direction Y.

The array substrate AR and the counter substrate CT are disposed such that the first and second alignment films AL1 and AL2 face each other. At this point, for example, a cell gap of 2 µm to 7 µm is formed between the first alignment film AL1 of the array substrate AR and the second alignment film AL2 of the counter substrate CT by columnar spacers, which are integrally formed on one of the substrates using resin material. The array substrate AR and the counter substrate CT are bonded by a sealing member SB outside the display area R1 while the cell gap is formed.

The liquid crystal layer LQ is retained by the cell gap formed between the array substrate AR and the counter substrate CT, and the liquid crystal layer LQ is disposed between the first alignment film AL1 and the second alignment film AL2. For example, the liquid crystal layer LQ has a positive dielectric anisotropy, namely the liquid crystal layer LQ is made of a p-type liquid crystal.

The interval between the primary pixel electrode PA and the primary common electrode CA in the row direction X is larger than a thickness (the cell gap) of the liquid crystal layer LQ, and the interval between the primary pixel electrode PA and the primary common electrode CA is larger than double the thickness (the cell gap) of the liquid crystal layer LQ.

Using a bonding agent, a first optical element OD1 is bonded to an outer surface of the array substrate AR, namely, an outer surface 10B of the first insulating substrate 10 constituting the array substrate AR. The first optical element OD1 is located on the side facing the backlight unit 4 of the liquid crystal display panel LPN, and controls a polarization state of light that is incident from the backlight unit 4 to the liquid crystal display panel LPN. The first optical element OD1 includes a first polarizer PL1 having a first polarizing axis (or a first absorption axis) AX1.

Using the bonding agent, a second optical element OD2 is bonded to an outer surface of the counter substrate CT, namely, an outer surface 20B of the second insulating substrate 20 constituting the counter substrate CT. The second optical element OD2 is located on the display surface side of the liquid crystal display panel LPN, and controls a polarization state of the light that is output from the liquid crystal display panel LPN. The second optical element OD2 includes a second polarizer PL2 having a second polarizing axis (or a second absorption axis) AX2.

For example, because the first polarizing axis AX1 and the second polarizing axis AX2 are orthogonal to each other, the first polarizer PL1 and the second polarizer PL2 are disposed in a crossed-Nicole manner. At this point, one of the polarizers is disposed such that the polarizing axis is parallel or orthogonal to the initial orientation direction of the liquid crystal molecule, namely, the first alignment treatment direction PD1 or the second alignment treatment direction PD2. In the case that the initial orientation direction is parallel to the column direction Y, the polarizing axis of one of the polarizers is parallel to the column direction Y or the row direction X.

In an example illustrated in a part (a) of FIG. 4, the first polarizer PL1 is disposed such that the first polarizing axis AX1 is orthogonal to the initial orientation direction (the column direction Y) of the liquid crystal molecule LM (that is, parallel to the row direction X), and the second polarizer PL2 is disposed such that the second polarizing axis AX2 is parallel to the initial orientation direction of the liquid crystal molecule LM (that is, parallel to the column direction Y).

In an example illustrated in a part (b) of FIG. 4, the second polarizer PL2 is disposed such that the second polarizing axis AX2 is orthogonal to the initial orientation direction (the column direction Y) of the liquid crystal molecule LM (that is, parallel to the row direction X), and the first polarizer PL1 is disposed such that the first polarizing axis AX1 is parallel to the initial orientation direction of the liquid crystal molecule LM (that is, parallel to the column direction Y).

An operation of the liquid crystal display panel LPN having the above configuration will be described below.

As illustrated in FIGS. 4 and 5, in a state in which the voltage is not applied to the liquid crystal layer LQ, namely, in a state (an OFF state) in which the electric field is not formed between the pixel electrode PE and the common electrode CE, the liquid crystal molecule LM of the liquid crystal layer LQ is oriented such that the long axis of the liquid crystal molecule LM is oriented toward the first slignment treatment direction PD1 of the first alignment film AL1 and the second alignment treatment direction PD2 of the second alignment film AL2. The OFF state corresponds to the initial orientation state, and the orientation direction of the liquid crystal molecule LM in the OFF state corresponds to the initial orientation direction.

Strictly speaking, the liquid crystal molecule LM is not necessarily oriented in parallel with the X-Y plane, but frequently pre-tilted. Therefore, the initial orientation direction of the liquid crystal molecule LM means a direction in which the long axis of the liquid crystal molecule LM in the OFF state is orthographically projected to the X-Y plane. In the following description, for the sake of convenience, it is assumed that the liquid crystal molecule LM is oriented in parallel to the X-Y plane, and that the liquid crystal molecule LM rotates in a plane parallel to the X-Y plane.

The first alignment treatment direction PD1 and the second alignment treatment direction PD2 are substantially parallel to the column direction Y. In the OFF state, the liquid crystal molecule LM is initially oriented toward the direction in which the long axis of the liquid crystal molecule LM is substantially parallel to the column direction Y, as illustrated by the dashed line in FIG. 4. That is, the initial orientation direction of the liquid crystal molecule LM is parallel to the column direction Y (or has an angle of 0° with respect to the column direction Y).

As illustrated in FIG. 4, in the case that the first alignment treatment direction PD1 and the second alignment treatment direction PD2 are parallel to each other and are the same direction, the liquid crystal molecule LM is oriented toward the substantially horizontal direction (a pre-tilt angle is substantial zero) in a neighborhood of a middle portion of the liquid crystal layer LQ in a section of the liquid crystal layer LQ, and the liquid crystal molecule LM is oriented with the pre-tilt angle that is symmetrical in relation to the middle portion in the neighborhood of the first alignment film AL1 and the neighborhood of the second alignment film AL2 (splay orientation).

When the ailgnment treatment is performed to the first alignment film AL1 in the first alignment treatment direction PD1, the liquid crystal molecule LM in the neighborhood of the first alignment film AL1 is initially oriented toward the first alignment treatment direction PD1. When the alignment treatment is performed to the second alignment film AL2 in the second alignment treatment direction PD2, the liquid crystal molecule LM in the neighborhood of the second alignment film AL2 is initially oriented toward the second alignment treatment direction PD2. In the case that the first alignment treatment direction PD1 and the second alignment treatment direction PD2 are parallel to each other and are the same direction, as described above, the liquid crystal molecule LM becomes the splay orientation, the orientation of the liquid crystal molecule LM in the neighborhood of the first alignment film AL1 on the array substrate AR and the orientation of the liquid crystal molecule LM in the neighborhood of the second alignment film AL2 on the counter substrate CT are perpendicularly symmetrical in relation to the middle portion of the liquid crystal layer LQ. The direction oblique to the direction normal to the substrate is optically compensated. Accordingly, in the case that the first alignment treatment direction PD1 and the second alignment treatment direction PD2 are parallel to each other and are the same direction, an optical leakage is hardly generated in the case of black display, and a high contrast ratio can be implemented to improve a display quality.

In the case that the first alignment treatment direction PD1 and the second alignment treatment direction PD2 are parallel to each other and are the reverse directions, the liquid crystal molecule LM is oriented with the pre-tilt angle in the neighborhood of the first alignment film AL1, the neighborhood of the second alignment film AL2, and the middle portion of the liquid crystal layer LQ (homogeneous orientation) in the section of the liquid crystal layer LQ.

The backlight from the backlight unit 4 is partially transmitted through the first polarizer PL1, and is incident to the liquid crystal display panel LPN. When passing through the liquid crystal layer LQ, the polarization state of the light incident to the liquid crystal display panel LPN varies depending on the orientation state of the liquid crystal molecule LM. In the OFF state, the light passing through the liquid crystal layer LQ is absorbed by the second polarizer PL2 (the black display).

On the other hand, in a state in which the voltage is applied to the liquid crystal layer LQ, namely, in a state (an ON state) in which the electric field is formed between the pixel electrode PE and the common electrode CE, a transverse electric field (or an oblique electric field) substantially parallel to the substrates is formed between the pixel electrode PE and the common electrode CE. The liquid crystal molecule LM is influenced by the electric field, and the long axis of the liquid crystal molecule LM rotates in a plane substantially parallel to the X-Y plane as illustrated by a solid line in FIG. 4.

In the example in FIG. 4, in the region between the pixel electrode PE and the primary common electrode CAL, the liquid crystal molecule LM rotates clockwise with respect to the column direction Y, and is oriented toward the lower left in FIG. 4. In the region between the pixel electrode PE and the primary common electrode CAR, the liquid crystal molecule LM rotates counterclockwise with respect to the column direction Y, and is oriented toward the lower right in FIG. 4.

In each pixel, when the electric field is formed between the pixel electrode PE and the common electrode CE, the orientation direction of the liquid crystal molecule LM is divided into plural directions with the pixel electrode PE as the boundary, and a domain is formed in each orientation direction. That is, plural domains are formed in one pixel PX.

In the ON state, the backlight incident from the backlight unit 4 to the liquid crystal display panel LPN is partially transmitted through the first polarizer PL1, and is incident to the liquid crystal display panel LPN. The backlight which has entered the liquid crystal layer LQ changes its polarization state. In the ON state, at least part of the light passing through the liquid crystal layer LQ is transmitted through the second polarizer PL2 (white display).

Figure 6:
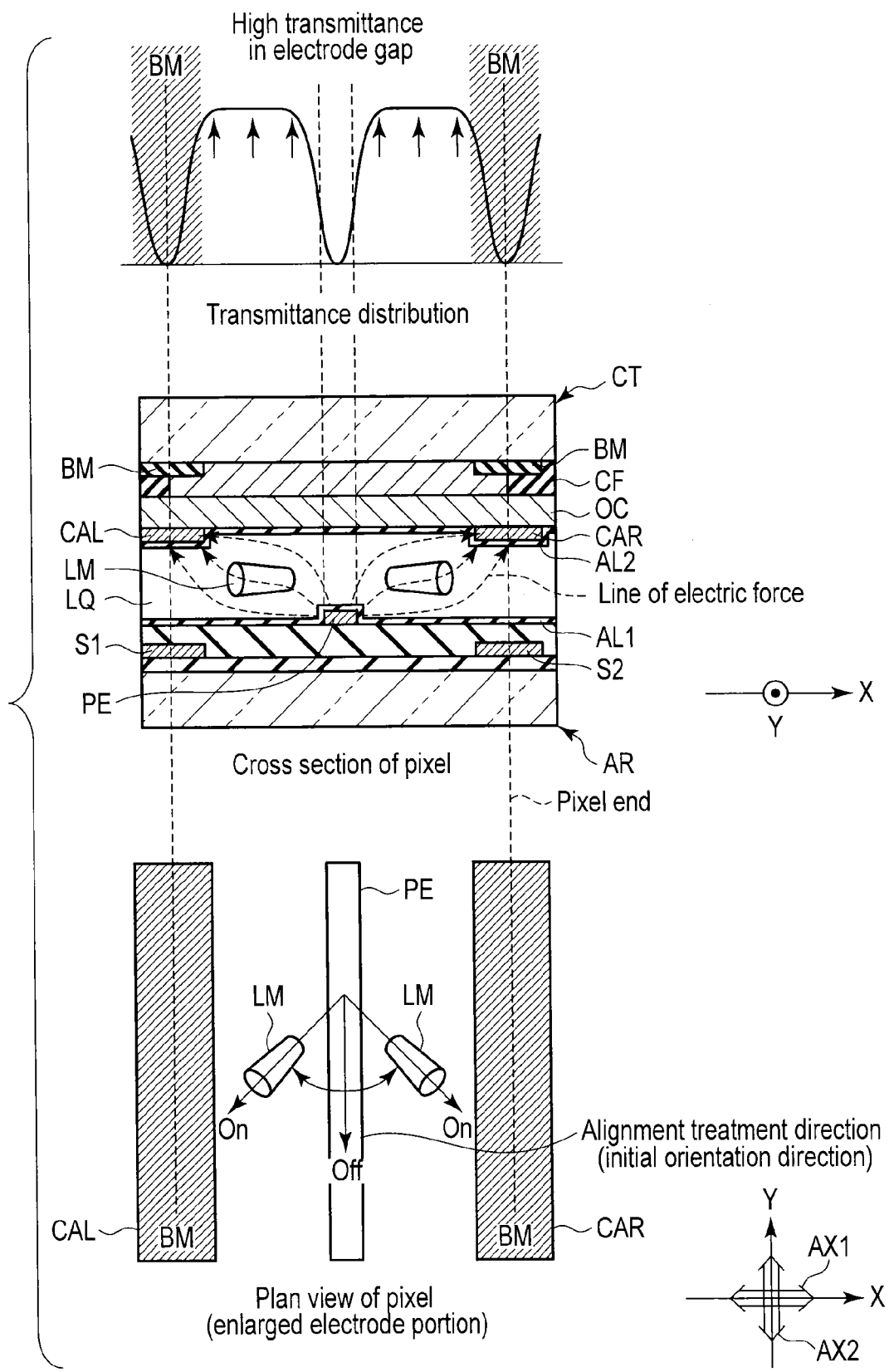
FIG. 6 is a view illustrating an electric field formed between a pixel electrode and a common electrode in the liquid crystal display panel in FIG. 4 and a relationship between a director of the liquid crystal molecule by the electric field and a transmittance.

FIG. 6 is a view illustrating an electric field formed between the pixel electrode PE and the common electrode CE in the liquid crystal display panel LPN in FIG. 4 and a relationship between a director and a transmittance of the liquid crystal molecule LM by the electric field.

As illustrated in FIG. 6, in the OFF state, the liquid crystal molecule LM is initially oriented toward the direction substantially parallel to the column direction Y. In the ON state in which a potential difference is formed between the pixel electrode PE and the common electrode CE, an optical modulation factor of the liquid crystal becomes the maximum (that is, the transmittance becomes the maximum in the aperture), when the director (or the long axis direction) of the liquid crystal molecule LM is deviated by about 45° in the X-Y plane with respect to the first polarizing axis AX1 of the first polarizer PL1 and the second polarizing axis AX2 of the second polarizer PL2.

In the example in FIG. 6, in the ON state, the director of the liquid crystal molecule LM between the primary common electrode CAL and the pixel electrode PE is substantially parallel to the orientation of 45°-225° in the X-Y plane, and the director of the liquid crystal molecule LM between the primary common electrode CAR and the pixel electrode PE is substantially parallel to the orientation of 135°-315° in the X-Y plane, and the peak transmittance is obtained. At this point, in the transmittance distribution per pixel, the transmittance becomes substantially zero on the pixel electrode PE and the common electrode CE, and a high transmittance is obtained in substantially the whole region in an electrode gap between the pixel electrode PE and the common electrode CE.

Each of the primary common electrode CAL located immediately above the signal line S1 and the primary common electrode CAR located immediately above the signal line S2 faces the black matrix BM, the primary common electrode CAL and the primary common electrode CAR have widths less than or equal to a width in the row direction X of the black matrix BM, and the primary common electrode CAL and the primary common electrode CAR do not extend to the side of the pixel electrode PE beyond the position facing the black matrix BM. Therefore, the aperture contributing to the display per pixel corresponds to the region between the black matrices BM, or the regions between the pixel electrode PE and the primary common electrode CAL and the primary common electrode CAR in the region between the signal line S1 and the signal line S2.

The OLB pad group pG, a switching circuit 13, the signal line driving circuit 90, a first driving circuit 31, a second driving circuit 32, a first switching circuit 41, a second switching circuit 42, a timing control circuit 70, and a buffer 80 will be described below. These components are disposed outside the display area R1. The OLB pad group pG, the switching circuit 13, the first driving circuit 31, the second driving circuit 32, the first switching circuit 41, the second switching circuit 42, the timing control circuit 70, and the buffer 80 are formed using the same material as the pixel PX and at the same time as the pixel PX is formed.

As illustrated in FIG. 2, the OLB pad group pG includes plural pads that are disposed in line along a peripheral edge of the array substrate AR (the first insulating substrate 10). The common electrode CE is indirectly connected to the pad, and a common voltage that is of a constant voltage is applied to the common electrode CE via the pad.

FIG. 7 is an enlarged plan view illustrating the outside of the display area R1 of the array substrate AR, and is a circuit diagram illustrating the switching circuit 13.

As illustrated in FIGS. 1, 2 and 7, the switching circuit 13 includes plural switch element groups 55, and each switch element group 55 includes plural switch elements 56. In the first embodiment, the switch element group 55 includes the three switch elements 56. The switching circuit 13 is a ⅓-multiplexer circuit. In the first embodiment, for example, the switch element 56 is constructed by a p-channel TFT. Alternatively, the switch element 56 is constructed by an n-channel TFT.

The switching circuit 13 is connected to the plural signal lines S. The switching circuit 13 is connected to the signal line driving circuit 90 via a connecting wiring 57. In this case, the number of connecting wirings 57 is one-third of the number of signal lines S.

ON/OFF of the switch element 56 is switched by control signals ASW1, ASW2, and ASW3 such that three signal lines S per output of the signal line driving circuit 90 (connecting wiring 57) are driven in a time-sharing manner. The controller 100 provides the control signals ASW1 to ASW3 to the switch elements 56 via the plural pads (not illustrated) and plural control wires 58 connected to the pads. During one horizontal scanning period (1H), the controller 100 provides the ON-control signals ASW1 to ASW3 to the switch elements 56 to write the desired video signals in the pixels PX arrayed in the row direction X.

The signal line driving circuit 90 is constructed by an IC (Integrated Circuit), and mounted on the first insulating substrate 10 (COG mounting). As can be seen from the above description, the signal line driving circuit 90 is indirectly connected to the plural signal lines S. The signal line driving circuit 90 is also connected to the plural pads. The signal line driving circuit 90 transfers the video signals, which are provided via the pads, to the switching circuit 13.

FIG. 8 is a plan view illustrating a schematic configuration of part of the array substrate AR, and is a view illustrating the scanning line G, the first driving circuit 31, the second driving circuit 32, the first switching circuit 41, and the second switching circuit 42.

As illustrated in FIGS. 2 and 8, the first driving circuit 31 and the second driving circuit 32 are formed on the first insulating substrate 10, and the first driving circuit 31 and the second driving circuit 32 output scanning signals while the pixels PX are sandwiched in the row direction X therebetween.

The first switching circuit 41 is connected between the first driving circuit 31 and plural scanning lines G. The first switching circuit 41 includes n/2 output changeover switches 41a. The output changeover switches 41a switch the connection states between the first driving circuit 31 and the scanning lines G under the control of the timing control circuit 70, particularly based on output switching control signals, which are provided from the first driving circuit 31 under the control of the timing control circuit 70.

The second switching circuit 42 is connected between the second driving circuit 32 and the plural scanning lines G. The second switching circuit 42 includes n/2 output changeover switches 42a. The output changeover switches 42a switch the connection states between the second driving circuit 32 and the scanning lines G under the control of the timing control circuit 70, particularly based on output switching control signals, which are provided from the second driving circuit 32 under the control of the timing control circuit 70.

FIG. 9 is a circuit diagram illustrating part of the pixels PX and the scanning lines G for any (k−1)th frame duration, and is a view illustrating a polarity of the pixel PX, magnitude of a feed-through voltage of the pixel PX, and an input direction of the scanning signal SL.

As illustrated in FIG. 9, and FIGS. 2 and 8, a negative-polarity video signal is provided to the pixel electrodes PE of plural (2L−1) (odd number)th-row pixels PX during the (k−1)th frame duration, and the voltage at (2L−1)th-row auxiliary capacitive line C is switched from a first auxiliary capacitive voltage to a second auxiliary capacitive voltage during a retention period of the pixel PX after the switching element SW of the pixel PX is turned off. Similarly, a positive-polarity video signal is provided to the pixel electrodes PE of plural 2L (even number)th-row pixels PX, and the voltage at 2Lth-row auxiliary capacitive line C is switched from the second auxiliary capacitive voltage to the first auxiliary capacitive voltage during the retention period of the pixel PX after the switching element SW of the pixel PX is turned off.

Here, L is a natural number. In the first embodiment, the first auxiliary capacitive voltage is a high-level voltage, and the second auxiliary capacitive voltage is a low-level voltage. Accordingly, the first auxiliary capacitive voltage is higher than the second auxiliary capacitive voltage. The pixel PX has the positive polarity in the case that the voltage at the pixel PX is higher than a common voltage Vcom after the voltage at the auxiliary capacitive line C is changed during the retention period, and the pixel PX has the negative polarity in the case that the voltage at the pixel PX is lower than the common voltage Vcom. A sign "+" is added to the positive-polarity pixel PX, and sign "−" is added to the negative-polarity pixel PX.

The liquid crystal display device of the first embodiment uses the conductively coupled driving (CC driving) in which, during any pixel PX, the potential at the auxiliary capacitive line C is switched from the first auxiliary capacitive voltage to the second auxiliary capacitive voltage during the pixel retention period until the switching element SW is turned on by the next scanning signal since the switching element SW is turned off, or the superimposed voltage is provided to the pixel PX by changing the potential from the second auxiliary capacitive voltage to the first auxiliary capacitive voltage.

During a (k−1)th frame duration, under the control of the timing control circuit 70, the first switching circuit 41 switches the connection states between the first driving circuit 31 and the scanning lines G such that the scanning signal SL is output to the 2Lth-row scanning line G, and the second switching circuit 42 switches the connection states between the second driving circuit 32 and the scanning lines G such that the scanning signal SL is output to the (2L−1)th-row scanning lines G.

In other words, the second switching circuit 42 is switched to a first state in which the second switching circuit 42 is connected to the plural (2L−1)th-row scanning lines G and the plural (2L−1)th-row auxiliary capacitive lines C. The first switching circuit 41 is switched to a second state in which the first switching circuit 41 is connected to the plural 2Lth-row scanning lines G and the plural 2Lth-row auxiliary capacitive lines C.

FIG. 10 is a graph illustrating retention potentials at first-row and second-row pixels PX for any (k−1)th frame duration during halftone raster display.

As illustrated in FIGS. 10 and 9, the retention voltage at the central pixel PX in the row direction X is the center of the retention voltage at the pixel PX having each polarity. The retention potential at the central pixel PX of the first row is the center (hereinafter referred to as a negative-polarity center) of the retention potential at the negative-polarity pixel PX. The retention potential at the central pixel PX of the second row is the center (hereinafter referred to as a positive-side center) of the retention potential at the positive-polarity pixel PX.

The pixel PX to which the scanning signal SL is initially input has the largest feed-through voltage, and the pixel PX to which the scanning signal SL is finally input has the smallest feed-through voltage. Therefore, the retention potential at the pixel PX at the right end (on the side of the first switching circuit 41) of the first row, the retention potential at the pixel PX at the right end of the second row, and the retention potential at the pixel PX at the left end (on the side of the second switching circuit 42) of the second row, and the retention potential at the pixel PX at the left end of the second row become as illustrated in FIG. 10.

Figure 11:
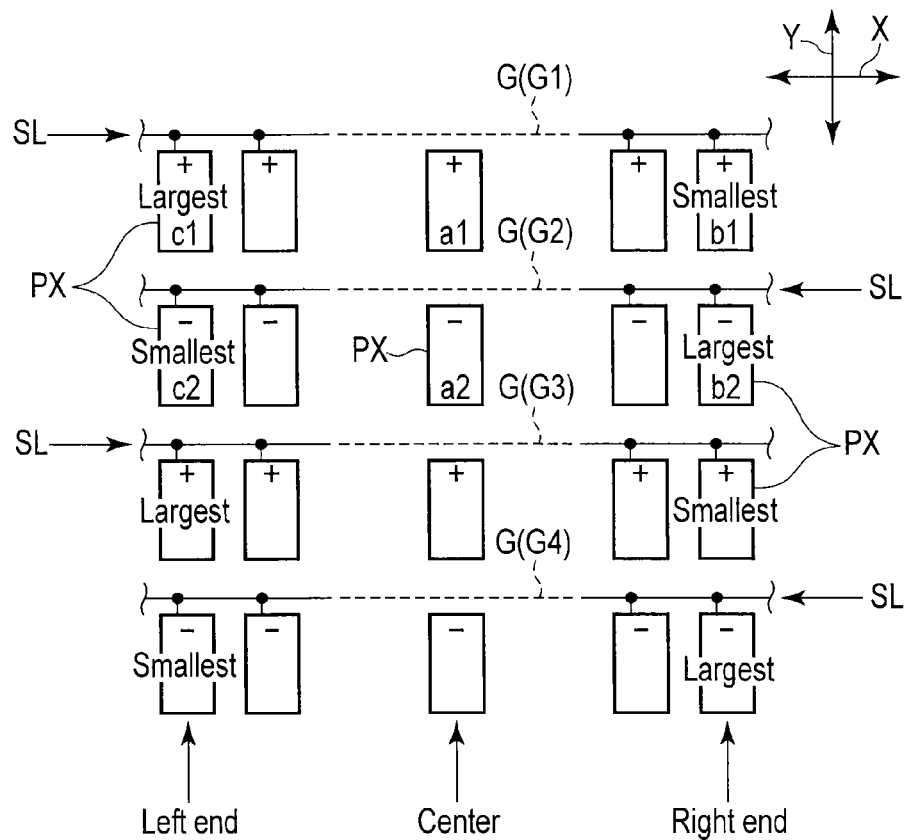
FIG. 11 is a circuit diagram illustrating part of the pixels and the scanning lines for any kth frame duration in the first embodiment, and is a view illustrating the polarity of the pixel, the magnitude of the feed-through voltage of the pixel, and the input direction of the scanning signal.

FIG. 11 is a circuit diagram illustrating part of the pixels PX and the scanning lines G for any kth frame duration, and is a view illustrating the polarity of the pixel PX, the magnitude of the feed-through voltage of the pixel PX, and the input direction of the scanning signal SL.

As illustrated in FIG. 11, and FIGS. 2 and 8, during the kth frame duration, the positive-polarity video signal is provided to the pixel electrodes PE of the plural (2L−1) (odd number)th-row pixels PX, and the voltage at the (2L−1)th-row auxiliary capacitive line C is switched from the second auxiliary capacitive voltage to the first auxiliary capacitive voltage during the retention period of the pixel PX after the switching element SW of the pixel PX is turned off. Similarly, the negative-polarity video signal is provided to the pixel electrodes PE of the plural 2L (even number)th-row pixels PX, and the voltage at the 2Lth-row auxiliary capacitive line C is switched from the first auxiliary capacitive voltage to the second auxiliary capacitive voltage during the retention period of the pixel PX after the switching element SW of the pixel PX is turned off. The sign "+" is added to the positive-polarity pixel PX, and the sign "−" is added to the negative-polarity pixel PX.

During the kth frame duration, under the control of the timing control circuit 70, the first switching circuit 41 maintains the connection states between the first driving circuit 31 and the scanning lines G such that the scanning signal SL is output to the 2Lth-row scanning lines G, and the second switching circuit 42 maintains the connection states between the second driving circuit 32 and the scanning lines G such that the scanning signal SL is output to the (2L−1)th-row scanning lines G.

Figure 12:
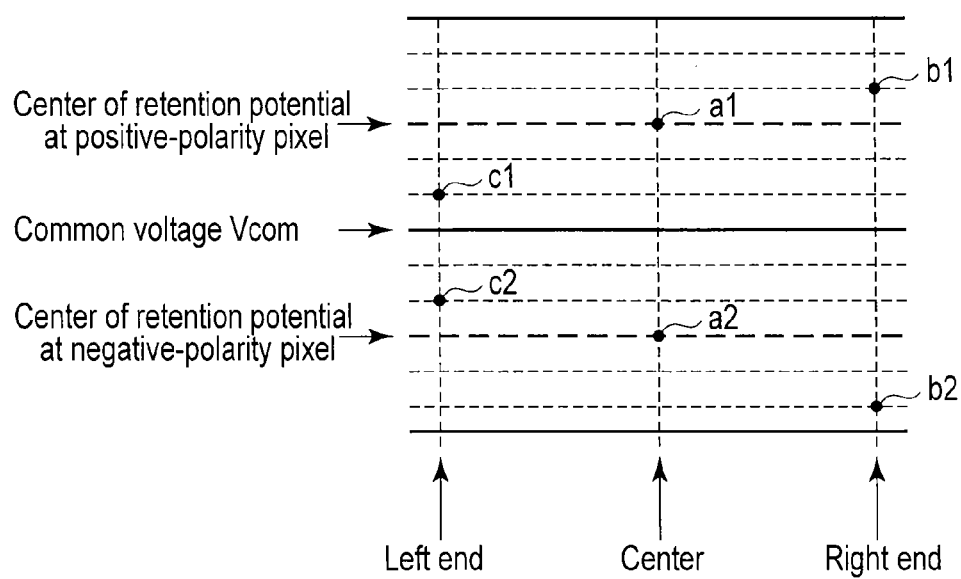
FIG. 12 is a graph illustrating the retention potentials at the first-row and second-row pixels for any kth frame duration during the halftone raster display in the first embodiment.

FIG. 12 is a graph illustrating the retention potentials at the first-row and second-row pixels PX for any kth frame duration during the halftone raster display.

As illustrated in FIGS. 12 and 11, the retention voltage at the central pixel PX in the row direction X is the center of the retention voltage at the pixel PX having each polarity. The retention potential at the central pixel PX of the first row is the positive-side center. The retention potential at the central pixel PX of the second row is the negative-side center.

Similarly, the pixel PX to which the scanning signal SL is initially input has the largest feed-through voltage, and the pixel PX to which the scanning signal SL is finally input has the smallest feed-through voltage. Therefore, the retention potential at the pixel PX at the right end of the first row, the retention potential at the pixel PX at the right end of the second row, and the retention potential at the pixel PX at the left end of the first row, and the retention potential at the pixel PX at the left end of the second row become as illustrated in FIG. 12.

Figure 13:
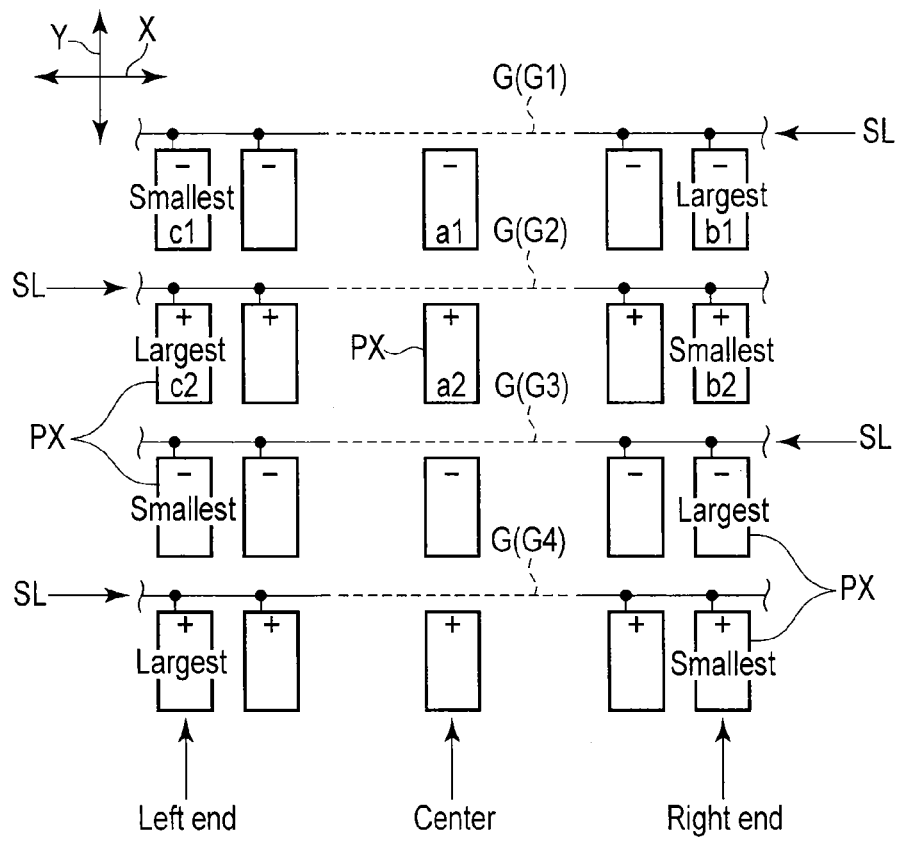
FIG. 13 is a circuit diagram illustrating part of the pixels and the scanning lines for any (k+1)th frame duration in the first embodiment, and is a view illustrating the polarity of the pixel, the magnitude of the feed-through voltage of the pixel, and the input direction of the scanning signal.

FIG. 13 is a circuit diagram illustrating part of the pixels PX and the scanning lines G for any (k+1)th frame duration, and is a view illustrating the polarity of the pixel PX, the magnitude of the feed-through voltage of the pixel PX, and the input direction of the scanning signal SL.

As illustrated in FIG. 13, and FIGS. 2 and 8, during the (k+1)th frame duration, the negative-polarity video signal is provided to the pixel electrodes PE of the plural (2L−1)th-row pixels PX, and the voltage at the (2L−1)th-row auxiliary capacitive line C is switched from the first auxiliary capacitive voltage to the second auxiliary capacitive voltage during the retention period of the pixel PX after the switching element SW of the pixel PX is turned off. Similarly, the positive-polarity video signal is provided to the pixel electrodes PE of the plural 2Lth-row pixels PX, and the voltage at the 2Lth-row auxiliary capacitive line C is switched from the second auxiliary capacitive voltage to the first auxiliary capacitive voltage during the retention period of the pixel PX after the switching element SW of the pixel PX is turned off.

The sign "+" is added to the positive-polarity pixel PX, and the sign "−" is added to the negative-polarity pixel PX.

During the (k+1)th frame duration, under the control of the timing control circuit 70, the first switching circuit 41 switches the connection states between the first driving circuit 31 and the scanning lines G such that the scanning signal SL is output to the (2L−1)th-row scanning lines G, and the second switching circuit 42 switches the connection states between the second driving circuit 32 and the scanning lines G such that the scanning signal SL is output to the 2Lth-row scanning lines G.

Figure 14:
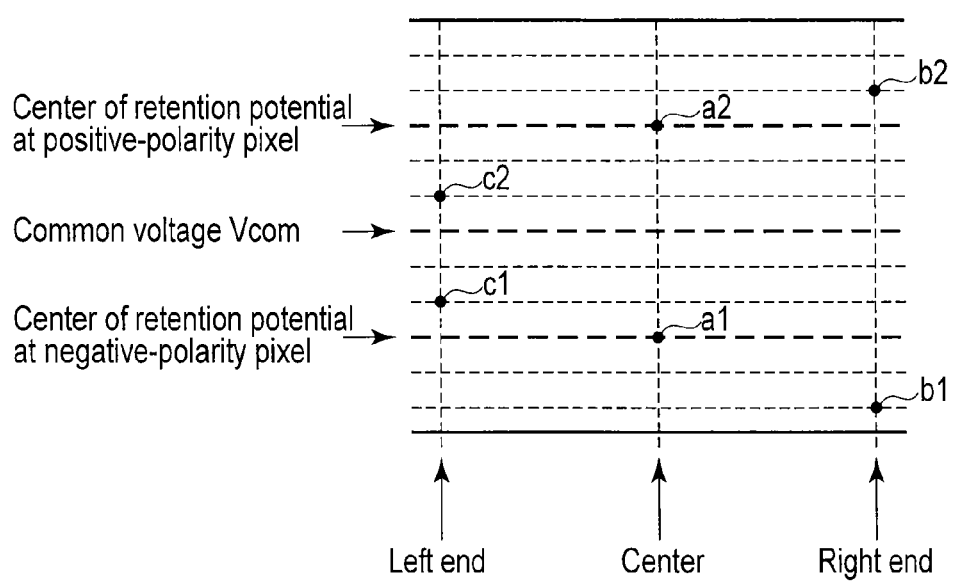
FIG. 14 is a graph illustrating the retention potentials at the first-row and second-row pixels for any (k+1)th frame duration during the halftone raster display in the first embodiment.

FIG. 14 is a graph illustrating the retention potentials at the first-row and second-row pixels PX for any (k+1)th frame duration during the halftone raster display.

As illustrated in FIGS. 14 and 13, the retention voltage at the central pixel PX in the row direction X is the center of the retention voltage at the pixel PX having each polarity. The retention potential at the central pixel PX of the first row is the negative-side center. The retention potential at the central pixel PX of the second row is the positive-side center.

Similarly, the pixel PX to which the scanning signal SL is initially input has the largest feed-through voltage, and the pixel PX to which the scanning signal SL is finally input has the smallest feed-through voltage. Therefore, the retention potential at the pixel PX at the right end of the first row, the retention potential at the pixel PX at the right end of the second row, the retention potential at the pixel PX at the left end of the first row, and the retention potential at the pixel PX at the left end of the second row become as illustrated in FIG. 14.

FIG. 15 is a circuit diagram illustrating part of the pixels PX and the scanning lines G for any (k+2)th frame duration, and is a view illustrating the polarity of the pixel PX, the magnitude of the feed-through voltage of the pixel PX, and the input direction of the scanning signal SL.

As illustrated in FIG. 15, and FIGS. 2 and 8, during the (k+2)th frame duration, the positive-polarity video signal is provided to the pixel electrodes PE of the plural (2L−1) (odd number)th-row pixels PX, and the voltage at the (2L−1)th-row auxiliary capacitive line C is switched from the second auxiliary capacitive voltage to the first auxiliary capacitive voltage during the retention period of the pixel PX after the switching element SW of the pixel PX is turned off. Similarly, the negative-polarity video signal is provided to the pixel electrodes PE of the plural 2L (even number)th-row pixels PX, and the voltage at the 2Lth-row auxiliary capacitive line C is switched from the first auxiliary capacitive voltage to the second auxiliary capacitive voltage during the retention period of the pixel PX after the switching element SW of the pixel PX is turned off.

The sign "+" is added to the positive-polarity pixel PX, and the sign "−" is added to the negative-polarity pixel PX.

During the (k+2)th frame duration, under the control of the timing control circuit 70, the first switching circuit 41 maintains the connection states between the first driving circuit 31 and the scanning lines G such that the scanning signal SL is output to the (2L−1)th-row scanning lines G, and the second switching circuit 42 maintains the connection states between the second driving circuit 32 and the scanning lines G such that the scanning signal SL is output to the 2Lth-row scanning lines G.

FIG. 16 is a graph illustrating the retention potentials at the first-row and second-row pixels for any (k+2)th frame duration during the halftone raster display.

As illustrated in FIGS. 16 and 15, the retention voltage at the central pixel PX in the row direction X is the center of the retention voltage at the pixel PX having each polarity. The retention potential at the central pixel PX of the first row is the positive-side center. The retention potential at the central pixel PX of the second row is the negative-polarity center.

Similarly, the pixel PX to which the scanning signal SL is initially input has the largest feed-through voltage, and the pixel PX to which the scanning signal SL is finally input has the smallest feed-through voltage. Therefore, the retention potential at the pixel PX at the right end of the first row, the retention potential at the pixel PX at the right end of the second row, the retention potential at the pixel PX at the left end of the first row, and the retention potential at the pixel PX at the left end of the second row become as illustrated in FIG. 16.

The operations during the above consecutive four frame durations are repeated in the following operations. For example, an operation during a (k+3)th frame duration is identical to that during the (k−1)th frame duration.

In the liquid crystal display device of the first embodiment, the burn-in phenomenon can be suppressed because the CC driving and the polarity inversion driving are used. The CC driving is used from the viewpoint of reducing the power consumption.

As illustrated in FIGS. 10, 12, 14, and 16, in the first embodiment, the retention potential at each pixel PX varies between the consecutive frames. However, when the retention potential at each pixel PX is viewed in a unit of two rows, sometimes the plot points become identical between the consecutive frames. In the first embodiment, the plot points become identical between the kth frame and the (k+1)th frame or between the (k+2)th frame and the (k+3)th frame. It is found from the above that the retention potential at the pixel PX in the unit of two rows becomes identical between the consecutive frames. Therefore, during the halftone raster display, the flicker can be reduced on the screen, particularly on the right and left end sides of the screen. The liquid crystal display device is formed as described above.

Examples of the first driving circuit 31, the second driving circuit 32, the first switching circuit 41, the second switching circuit 42, the timing control circuit 70, and the buffer 80 will be described below. The following examples are described only as examples, and these components are not limited to the following examples.

Figure 17:
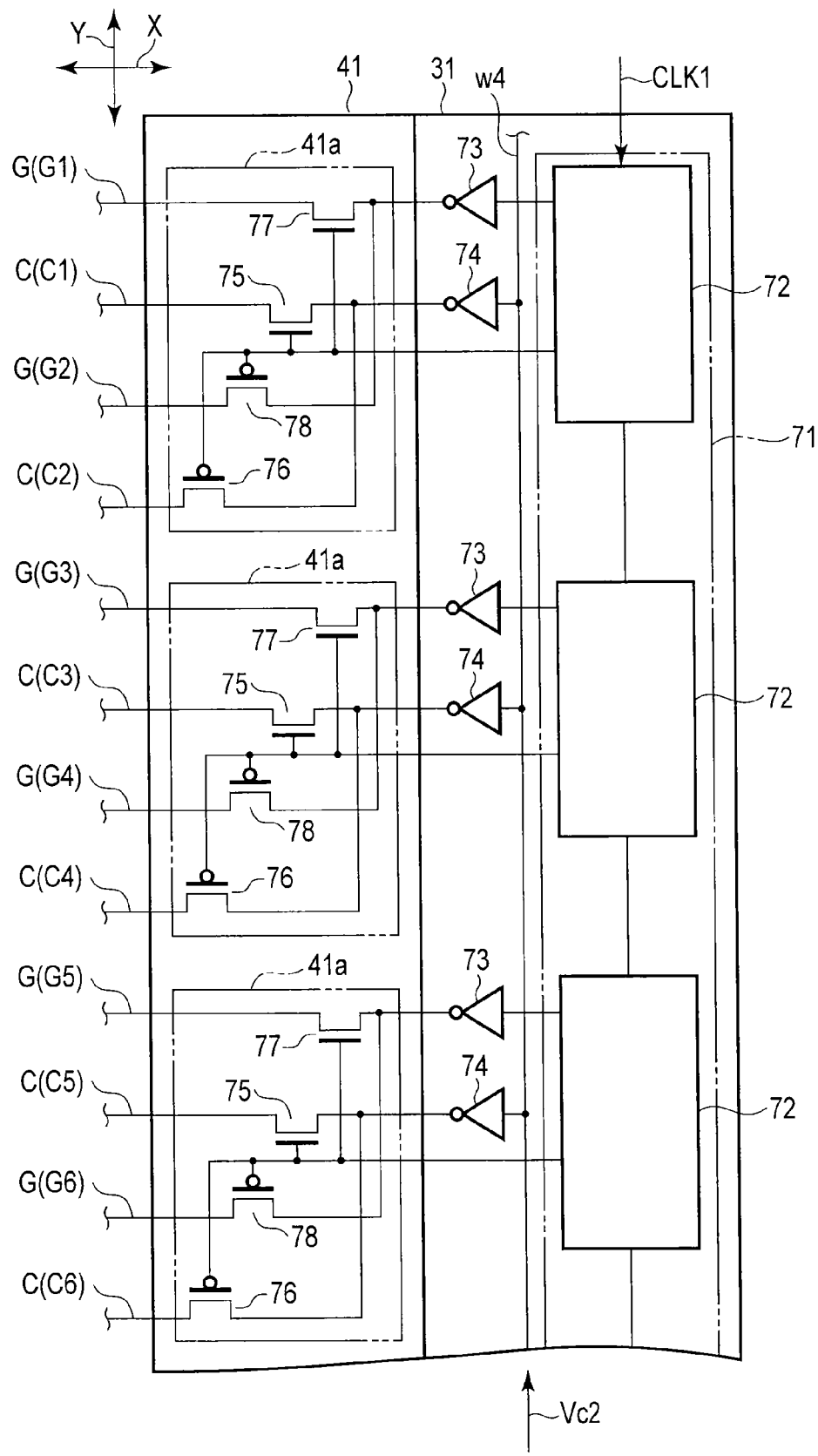
FIG. 17 is a circuit diagram in which the first driving circuit and the first switching circuit are partially enlarged.

FIG. 17 is a circuit diagram in which the first driving circuit 31 and the first switching circuit 41 are partially enlarged.

As illustrated in FIG. 17, and FIGS. 2 and 8, the first driving circuit 31 includes an order circuit 71 that is of the first order circuit, plural buffers 73, and plural buffers 74. The order circuit 71 includes n/2 shift registers 72. The buffer 73 is connected to the shift register 72 on a one-on-one level. Therefore, the first driving circuit 31 can sequentially provide the scanning signal via the buffer 73. The first driving circuit 31 can sequentially provide the output switching control signal via the shift register 72.

A second auxiliary capacitive voltage supply line w4 extends in the first driving circuit 31 to form the first driving circuit 31. One end side of the second auxiliary capacitive voltage supply line w4 is located out of the first driving circuit 31, and connected to a pad p4. An auxiliary capacitive voltage Vc2 is supplied to the second auxiliary capacitive voltage supply line w4 via the pad p4. A level of the auxiliary capacitive voltage Vc2 is alternately switched between a high level (the level of the first auxiliary capacitive voltage) and a low level (the level of the second auxiliary capacitive voltage) in each of two frame durations.

Plural output changeover switches 41a are provided according to the scanning lines G and the auxiliary capacitive lines C of the consecutive two rows. The output changeover switch 41a includes an NMOS transistor 75 that is of the switching element, a PMOS transistor 76 that is of the switching element, an NMOS transistor 77 that is of the switching element, and a PMOS transistor 78 that is of the switching element.

The NMOS transistor 75 is connected between the buffer 74 and the (2L−1)th-row auxiliary capacitive line C. The PMOS transistor 76 is connected between the buffer 74 and the 2Lth-row auxiliary capacitive line C. The NMOS transistor 77 is connected between the buffer 73 and the (2L−1)th-row scanning line G. The PMOS transistor 78 is connected between the buffer 73 and the 2Lth-row scanning line G.

ON/OFF of the NMOS transistors 75 and 77 and the PMOS transistors 76 and 78 is switched in each of two frame durations based on the output switching control signal (a polarity inversion control signal) from the shift register 72.

FIG. 18 is a circuit diagram in which the second driving circuit 32 and the second switching circuit 42 are partially enlarged.

As illustrated in FIG. 18, and FIGS. 2 and 8, the second driving circuit 32 includes an order circuit 81 that is of a second order circuit, plural buffers 83, and plural buffers 84. The order circuit 81 includes n/2 shift registers 82. The buffer 83 is connected to the shift register 82 on a one-on-one level. Therefore, the second driving circuit 32 can sequentially provide the scanning signal via the buffer 83. The second driving circuit 32 can sequentially provide the output switching control signal via the shift register 82.

A first auxiliary capacitive voltage supply line w5 extends in the second driving circuit 32 to form the second driving circuit 32. One end side of the first auxiliary capacitive voltage supply line w5 is located out of the second driving circuit 32, and connected to a pad p5. An auxiliary capacitive voltage Vc1 is supplied to the first auxiliary capacitive voltage supply line w5 via the pad p5. A level of the auxiliary capacitive voltage Vc1 is alternately switched between the high level (the level of the first auxiliary capacitive voltage) and the low level (the level of the second auxiliary capacitive voltage) in each of two frame durations.

Plural output changeover switches 42a are provided according to the scanning lines G and the auxiliary capacitive lines C of the consecutive two rows. The output changeover switch 42a includes an NMOS transistor 85 that is of the switching element, a PMOS transistor 86 that is of the switching element, an NMOS transistor 87 that is of the switching element, and a PMOS transistor 88 that is of the switching element.

The NMOS transistor 85 is connected between the buffer 84 and the (2L−1)th-row auxiliary capacitive line C. The PMOS transistor 86 is connected between the buffer 84 and the 2Lth-row auxiliary capacitive line C. The NMOS transistor 87 is connected between the buffer 83 and the (2L−1)th-row scanning line G. The PMOS transistor 88 is connected between the buffer 83 and the 2Lth-row scanning line G.

ON/OFF of the NMOS transistors 85 and 87 and the PMOS transistors 86 and 88 is switched in each of two frame durations based on the output switching control signal (the polarity inversion control signal) from the shift register 82.

At this point, the NMOS transistors 75, 77, 85, and 87 and the PMOS transistors 76, 78, 86, and 88 may be either the top-gate type TFT or the bottom gate type TFT, and are formed using the same material as the switching element SW and at the same time as the switching element SW is formed.

As illustrated in FIG. 2, and FIGS. 17 and 18, the timing control circuit 70 is connected to pads p1 and p2 via wirings w1 and w2. The controller 100 provides a first control signal Con1 to the timing control circuit 70 via the pad p1 and the wiring w1. The controller 100 provides a second control signal Con2 to the timing control circuit 70 via the pad p2 and the wiring w2.

The timing control circuit 70 and the buffer 80 are connected by a wiring w9. The buffer 80 and the first driving circuit 31 are connected by a wiring w7. The buffer 80 and the second driving circuit 32 are connected by a wiring w8.

The timing control circuit 70 is formed by combining a frequency-dividing circuit and a two-stage shift register. The timing control circuit 70 generates a first synchronizing signal CLK1 and a second synchronizing signal CLK2, which have phases different from each other, by inputting the first control signal Con1 and the second control signal Con2. Compared with the first synchronizing signal CLK1, the phase of the second synchronizing signal CLK2 is deviated by one horizontal scanning period. The timing control circuit 70 provides the first synchronizing signal CLK1 to the first driving circuit 31 via the buffer 80, and provides the second synchronizing signal CLK2 to the second driving circuit 32 via the buffer 80.

Therefore, the first driving circuit 31, the second driving circuit 32, the first switching circuit 41, and the second switching circuit 42 can sequentially provide the scanning signal to the plural scanning lines G in each row in the case that the first synchronizing signal CLK1 is provided to the first driving circuit 31 while the second synchronizing signal CLK2 is provided to the second driving circuit 32.

In this case, the first driving circuit 31, the second driving circuit 32, the first switching circuit 41, and the second switching circuit 42 can sequentially provide the first auxiliary capacitive voltage or the second auxiliary capacitive voltage to the plural auxiliary capacitive lines C in each row. Particularly, the high-level auxiliary capacitive voltage Vc1 or the low-level auxiliary capacitive voltage Vc2 can sequentially be provided to the plural auxiliary capacitive lines C in each row, or the low-level auxiliary capacitive voltage Vc1 or the high-level auxiliary capacitive voltage Vc2 can sequentially be provided to the plural auxiliary capacitive lines C in each row.

According to the liquid crystal display device of the first embodiment having the above configuration, the liquid crystal display device includes the array substrate AR, the counter substrate CT, the liquid crystal layer LQ, the plural pixels PX, the first driving circuit 31, the second driving circuit 32, the first switching circuit 41, the second switching circuit 42, and the timing control circuit 70. In the liquid crystal display device of the first embodiment, the image-burn phenomenon can be suppressed because the CC driving and the polarity inversion driving are used. The CC driving is used from the viewpoint of reducing the power consumption.

During the kth frame duration, under the control of the timing control circuit 70, the first switching circuit 41 switches the connection state between the first driving circuit 31 and the scanning line G such that the scanning signal is output to the 2Lth-row scanning line G, and the second switching circuit 42 switches the connection state between the second driving circuit 32 and the scanning line G such that the scanning signal is output to the (2L−1)th-row scanning line G.

During the (k+1)th frame duration, under the control of the timing control circuit 70, the first switching circuit 41 switches the connection state between the first driving circuit 31 and the scanning line G such that the scanning signal is output to the (2L−1)th-row scanning line G, and the second switching circuit 42 switches the connection state between the second driving circuit 32 and the scanning line G such that the scanning signal is output to the 2Lth-row scanning line G.

In the case that the first auxiliary capacitive voltage is at the high-level while the second auxiliary capacitive voltage is at the low-level, the liquid crystal display device of the first embodiment switches the auxiliary capacitive voltage Vc1 (Vc2) from the second auxiliary capacitive voltage to the first auxiliary capacitive voltage during the pixel retention period when the pixel has the positive polarity in one frame duration. As a result, the pixel retention voltage polarity becomes positive. Similarly, the auxiliary capacitive voltage Vc1(Vc2) is switched from the first auxiliary capacitive voltage to the second auxiliary capacitive voltage during the pixel retention period when the pixel has the negative polarity. As a result, the pixel retention voltage polarity becomes negative. The CC driving can be performed while the voltage provided to the auxiliary capacitive line C is switched during the pixel retention period, so that the amplitude of the video signal provided to the signal line S can be reduced. Therefore, for example, the power consumption of the liquid crystal display device can be reduced.

While the CC driving is performed, the input direction of the scanning signal is switched in each of two frame durations. The retention potential at the pixel PX in the unit of two rows becomes identical between the consecutive frames (for example, between the kth frame and the (k+1)th frame). Therefore, the generation of the flicker can be reduced in the halftone raster display. A length of two rows in the column direction Y is minimal, so that the generation of a horizontal streak can be suppressed.

The first switching circuit 41 is connected between the first driving circuit 31 and the plural auxiliary capacitive lines C, and the second switching circuit 42 is connected between the second driving circuit 32 and the plural auxiliary capacitive lines C. As illustrated in FIGS. 17 and 18, the first driving circuit 31, the second driving circuit 32, the first switching circuit 41, and the second switching circuit 42 are formed, which allows the potential at the auxiliary capacitive line C to be switched to the desired value in each frame duration by driving the first switching circuit 41 and the second switching circuit 42.

During the (k−1)th frame duration, under the control of the timing control circuit 70, the first switching circuit 41 adjusts the connection state between the first driving circuit 31 and the auxiliary capacitive line C such that the high-level auxiliary capacitive voltage Vc2 (the first auxiliary capacitive voltage) is provided to the 2Lth-row auxiliary capacitive line C, and the second switching circuit 42 adjusts the connection state between the second driving circuit 32 and the auxiliary capacitive line C such that the low-level auxiliary capacitive voltage Vc1 (the first auxiliary capacitive voltage) is provided to the (2L−1)th-row auxiliary capacitive line C.

During the kth frame duration, under the control of the timing control circuit 70, the first switching circuit 41 maintains the connection state between the first driving circuit 31 and the auxiliary capacitive line C such that the low-level auxiliary capacitive voltage Vc2 (the second auxiliary capacitive voltage) is provided to the 2Lth-row auxiliary capacitive line C, and the second switching circuit 42 maintains the connection state between the second driving circuit 32 and the auxiliary capacitive line C such that the high-level auxiliary capacitive voltage Vc1 (the first auxiliary capacitive voltage) is provided to the (2L−1)th-row auxiliary capacitive line C.

During the (k+1)th frame duration, under the control of the timing control circuit 70, the first switching circuit 41 switches the connection state between the first driving circuit 31 and the auxiliary capacitive line C such that the low-level auxiliary capacitive voltage Vc2 (the second auxiliary capacitive voltage) is provided to the (2L−1)th-row auxiliary capacitive line C, and the second switching circuit 42 switches the connection state between the second driving circuit 32 and the auxiliary capacitive line C such that the high-level auxiliary capacitive voltage Vc1 (the first auxiliary capacitive voltage) is provided to the 2Lth-row auxiliary capacitive line C.

During the (k+2)th frame duration, under the control of the timing control circuit 70, the first switching circuit 41 maintains the connection state between the first driving circuit 31 and the auxiliary capacitive line C such that the high-level auxiliary capacitive voltage Vc2 (the first auxiliary capacitive voltage) to the (2L−1)th-row auxiliary capacitive line C, and the second switching circuit 42 maintains the connection state between the second driving circuit 32 and the auxiliary capacitive line C such that the low-level auxiliary capacitive voltage Vc1 (the second auxiliary capacitive voltage) is provided to the 2Lth-row auxiliary capacitive line C.

According to the first embodiment, because the high transmittance is obtained in the electrode gap between the pixel electrode PE and the common electrode CE, the transmittance per pixel can sufficiently be enhanced by enlarging the distances between the pixel electrode PE and the primary common electrode CAL and the primary common electrode CAR. For a product specification in which the pixel pitch varies, the peak condition of the transmittance distribution in FIG. 6 can be used by changing the distance between the electrodes (that is, the position where the primary common electrode CA is disposed is changed with respect to the pixel electrode PE disposed in the substantial center of the pixel PX).

That is, in the display mode of the first embodiment, it is not always necessary to finely process the electrode from a low-resolution product specification in which the pixel pitch is relatively large to a high-resolution product specification in which the pixel pitch is relatively small, and products having various pixel pitches can be provided by setting the distance between the electrodes. Accordingly, demand for the high transmittance and the high resolution can easily be accommodated.

According to the first embodiment, as illustrated in FIG. 6, the transmittance is sufficiently lowered in the transmittance distribution in the region facing the black matrix BM. Because the leakage of the electric field is not generated outside the pixel beyond the position of the common electrode CE, and because the undesired transverse electric field is not generated between the pixels adjacent to each other across the black matrix BM, the liquid crystal molecule maintains the initial orientation state in the region facing the black matrix BM like the OFF state (or the black display state). Accordingly, even if the pixels adjacent to each other differ from each other in the color of the color filter, the generation of color mixture can be suppressed, and degradation of color reproducibility or degradation of a contrast ratio can be suppressed.

In the case that a misalignment is generated between the array substrate AR and the counter substrate CT, sometimes the distance between the pixel electrode PE and part of the common electrode CE on both sides of the pixel electrode PE differs from the distance between the pixel electrode PE and the other common electrode CE. However, because the misalignment is commonly generated in all the pixels PX, the electric field distribution is identical among the pixels PX, and such misalignment only has a small influence on the image display. The undesired leakage of the electric field to the adjacent pixel can be suppressed even if the misalignment is generated between the array substrate AR and the counter substrate CT. Therefore, even if the pixels adjacent to each other differ from each other in the color of the color filter, the generation of the color mixture can be suppressed, and the degradation of the color reproducibility or the degradation of the contrast ratio can be suppressed.

According to the first embodiment, the primary common electrode CA faces the signal line S. Particularly, in the case that the primary common electrode CAL and the primary common electrode CAR are disposed immediately above the signal line S1 and the signal line S2, the aperture AP can be enlarged to improve the transmittance of the pixel PX compared with the case that the primary common electrode CAL and the primary common electrode CAR are disposed on the side of the pixel electrode PE from the signal line S1 and the signal line S2.

The distances between the pixel electrode PE, and the primary common electrode CAL and the primary common electrode CAR can be enlarged to form the more-nearly-horizontal transverse electric field by disposing the primary common electrode CAL and the primary common electrode CAR immediately above the signal line S1 and the signal line S2. Therefore, a wide view angle that is an advantage of the conventional IPS mode can be maintained. The liquid crystal display device has a high-speed response property, and is specialized in the orientation stability.

According to the first embodiment, the plural domains can be formed in one pixel. Therefore, the view angle can optically be compensated by the plural directions to implement the wide view angle.

In the ON state, because the transverse electric field (the oblique electric field) is hardly formed above the pixel electrode PE or the common electrode CE (or an electric field sufficient to drive the liquid crystal molecule LM is not formed), the liquid crystal molecule LM hardly moves from the initial orientation direction like the OFF state. Therefore, even if the pixel electrode PE and the common electrode CE are made of optically-transparent conductive materials, such as ITO, the backlight is hardly transmitted through the pixel electrode PE and the common electrode CE, and the pixel electrode PE and the common electrode CE hardly contribute to the display in the ON state. Accordingly, the pixel electrode PE and the common electrode CE are not necessarily made of the optically-transparent conductive material, but may be made of conductive materials, such as aluminum, silver, and copper.

As described above, the excellent-display-quality liquid crystal display device, in which the power consumption is reduced, the generation of the flicker is reduced, and the image-burn phenomenon is suppressed, can be obtained.

A liquid crystal display device according to a modification of the first embodiment will be described below. For example, the liquid crystal display device may be configured such that the operation during the kth frame duration and the operation during the (k+1)th frame duration are repeated while the operation during the (k−1)th frame duration and the operation during the (k+2)th frame duration are stopped. In this case, although the effect to suppress the image-burn phenomenon is not obtained, the power consumption can be reduced, and the generation of the flicker can be reduced. Therefore, the liquid crystal display device having the excellent display quality can be obtained.

A liquid crystal display device according to a second embodiment will be described in detail. In the second embodiment, the same components as in the first embodiment are designated by the same numerals, and the description of such is omitted.

FIG. 19 is a plan view illustrating a schematic configuration of an array substrate AR of the liquid crystal display device of the second embodiment.

As illustrated in FIG. 19, unlike the first embodiment, the liquid crystal display device is formed without providing the first switching circuit 41 and the second switching circuit 42.

A first driving circuit 31 and a second driving circuit 32 will be described below. The first driving circuit 31 is connected to (4L−1)th-row and 4Lth-row scanning lines G, and the second driving circuit 32 is connected to (4L−3)th-row and (4L−2)th-row scanning lines G.

In the second embodiment, the first driving circuit 31 is also connected to (4L−1)th-row and 4Lth-row auxiliary capacitive lines C, and the second driving circuit 32 is also connected to (4L−3)th-row and (4L−2)th-row auxiliary capacitive lines C. Each of the first and second driving circuits 31 and 32 outputs the scanning signal, the first auxiliary capacitive voltage, and the second auxiliary capacitive voltage.

Under the control of a timing control circuit 70, the first driving circuit 31 outputs the scanning signal to the (4L−1)th-row and 4Lth-row scanning lines G scanning signal, and outputs the first auxiliary capacitive voltage or the second auxiliary capacitive voltage to the (4L−1)th-row and 4Lth-row auxiliary capacitive lines C. Particularly, the first driving circuit 31 outputs the first auxiliary capacitive voltage or the second auxiliary capacitive voltage to the (4L−1)th-row and 4Lth-row auxiliary capacitive lines C based on the polarity inversion control signal, which is generated in the first driving circuit 31 under the control of the timing control circuit 70.

Under the control of the timing control circuit 70, the second driving circuit 32 outputs the scanning signal to (4L−3)th-row and (4L−2)th-row scanning lines G, and outputs the first auxiliary capacitive voltage or the second auxiliary capacitive voltage to the (4L−3)th-row and (4L−2)th-row auxiliary capacitive lines C. Particularly, the second driving circuit 32 outputs the first auxiliary capacitive voltage or the second auxiliary capacitive voltage to the (4L−3)th-row and (4L−2)th-row auxiliary capacitive lines C based on the polarity inversion control signal, which is generated in the second driving circuit 32 under the control of the timing control circuit 70.

Figure 20:
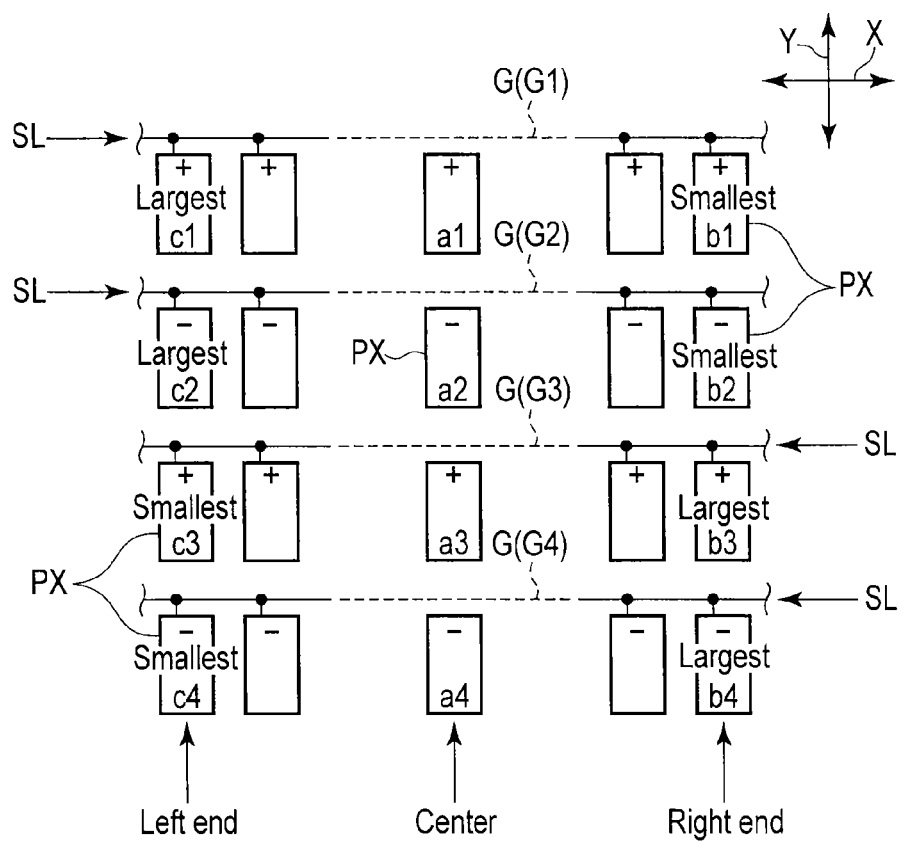
FIG. 20 is a circuit diagram illustrating part of pixels and scanning lines for any kth frame duration in the second embodiment, and is a view illustrating the polarity of the pixel, the magnitude of the feed-through voltage of the pixel, and the input direction of the scanning signal.

FIG. 20 is a circuit diagram illustrating part of pixels PX and scanning lines G for any kth frame duration, and is a view illustrating the polarity of the pixel PX, the magnitude of the feed-through voltage of the pixel PX, and the input direction of a scanning signal SL.

As illustrated in FIGS. 20 and 19, during the kth frame duration, the positive-polarity video signal is provided to the pixel electrodes PE of the plural (4L−3)th-row and (4L−1)th-row pixels PX, and the voltage at the (4L−3)th-row and (4L−1)th-row auxiliary capacitive lines C is switched from the second auxiliary capacitive voltage to the first auxiliary capacitive voltage during the retention period of the pixel PX after the switching element SW of the pixel PX is turned off. Similarly, the negative-polarity video signal is provided to the pixel electrodes PE of the plural (4L−2)th-row and 4Lth-row pixels PX, and the voltage at the (4L−2)th-row and 4Lth-row auxiliary capacitive lines C is switched from the first auxiliary capacitive voltage to the second auxiliary capacitive voltage during the retention period of the pixel PX after the switching element SW of the pixel PX is turned off.

In the second embodiment, in the case that the auxiliary capacitive voltage Vc1 is the first auxiliary capacitive voltage (the high-level voltage) while the auxiliary capacitive voltage Vc2 is the second auxiliary capacitive voltage (the low-level voltage), the liquid crystal display device switches the auxiliary capacitive voltage from the auxiliary capacitive voltage Vc2 to the auxiliary capacitive voltage Vc1 when the pixel has the positive polarity during one frame duration. As a result, the pixel retention voltage polarity becomes positive. Similarly, the auxiliary capacitive voltage is switched from the auxiliary capacitive voltage Vc1 to the auxiliary capacitive voltage Vc2 during the pixel retention period when the pixel has the negative polarity. As a result, the pixel retention voltage polarity becomes negative. The capacitively coupled driving (CC driving), in which the superimposed voltage is provided to the pixel electrode PE while the potential at the auxiliary capacitive line C is changed during the pixel retention period, is used.

During the kth frame duration, under the control of the timing control circuit 70, the first driving circuit 31 outputs the scanning signal to the plural (4L−1)th-row and 4Lth-row scanning lines G, and the second driving circuit 32 outputs the scanning signal to the plural (4L−3)th-row and (4L−2)th-row scanning lines G.

Figure 21:
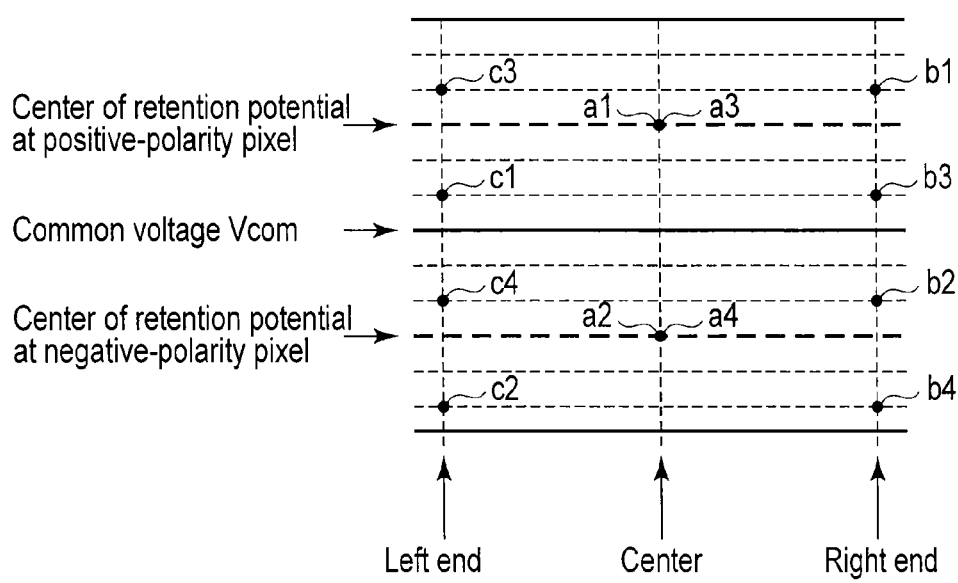
FIG. 21 is a graph illustrating retention potentials at first-row to fourth-row pixels for any kth frame duration during the halftone raster display in the second embodiment.

FIG. 21 is a graph illustrating retention potentials at first-row to fourth-row pixels PX for any kth frame duration during the halftone raster display.

As illustrated in FIGS. 21 and 20, the retention voltage at the central pixel PX in the row direction X is the center of the retention voltage at the pixel PX having each polarity. The retention potentials at the central pixels PX of the first and third rows are the positive-side center. The retention potentials at the central pixels PX of the second and fourth rows are the negative-side center.

The pixel PX to which the scanning signal SL is initially input has the largest feed-through voltage, and the pixel PX to which the scanning signal SL is finally input has the smallest feed-through voltage. Therefore, the retention potentials at the pixel PX at the right ends (the side of the first driving circuit 31) of the first to fourth rows and the retention potentials at the pixels PX at the left ends (the side of the second driving circuit 32) of the first to fourth rows become as illustrated in FIG. 21.

FIG. 22 is a circuit diagram illustrating part of the pixels PX and the scanning lines G for any (k+1)th frame duration, and is a view illustrating the polarity of the pixel PX, the magnitude of the feed-through voltage of the pixel PX, and the input direction of the scanning signal SL.

As illustrated in FIGS. 22 and 19, during the (k+1)th frame duration, the negative-polarity video signal is provided to the pixel electrodes PE of the plural (4L−3)th-row and (4L−1)th-row pixels PX, and the voltage at the (4L−3)th-row and (4L−1)th-row auxiliary capacitive lines C is switched from the first auxiliary capacitive voltage to the second auxiliary capacitive voltage during the retention period of the pixel PX after the switching element SW of the pixel PX is turned off. Similarly, the positive-polarity video signal is provided to the pixel electrodes PE of the plural (4L−2)th-row and 4Lth-row pixels PX, and the voltage at the (4L−2)th-row and 4Lth-row auxiliary capacitive lines C is switched from the second auxiliary capacitive voltage to the first auxiliary capacitive voltage during the retention period of the pixel PX after the switching element SW of the pixel PX is turned off.

During the (k+1)th frame duration, under the control of the timing control circuit 70, the first driving circuit 31 outputs the scanning signal to the plural (4L−1)th-row and 4Lth-row scanning lines G, and the second driving circuit 32 outputs the scanning signal to the plural (4L−3)th-row and (4L−2)th-row scanning lines G.

FIG. 23 is a graph illustrating the retention potentials at the first-row to fourth-row pixels PX for any (k+1)th frame duration during the halftone raster display.

As illustrated in FIGS. 23 and 22, the retention voltage at the central pixel PX in the row direction X is the center of the retention voltage at the pixel PX having each polarity. The retention potentials at the central pixels PX of the first and third rows are the negative-side center. The retention potentials at the central pixels PX of the second and fourth rows are the positive-side center.

Similarly, the pixel PX to which the scanning signal SL is initially input has the largest feed-through voltage, and the pixel PX to which the scanning signal SL is finally input has the smallest feed-through voltage. Therefore, the retention potentials at the pixel PX at the right ends of the first to fourth rows and the retention potentials at the pixels PX at the left ends of the first to fourth rows become as illustrated in FIG. 23.

The operations during the above consecutive two frame durations are repeated in the following operations. For example, an operation during the (k+2)th frame duration is identical to that during the kth frame duration, and an operation during the (k+3)th frame duration is identical to that during the (k+1)th frame duration.

In the liquid crystal display device of the second embodiment, the image-burn phenomenon can be suppressed because the CC driving is used.

As illustrated in FIGS. 21 and 23, the retention potential at each pixel PX varies between the consecutive frames. However, when the retention potential at each pixel PX is viewed in a unit of four rows, because the plot points become identical between the consecutive frames, it is found that the retention potential at the pixel PX in the unit of four rows becomes identical between the consecutive frames. Therefore, during the halftone raster display, the flicker can be reduced on the screen, particularly on the right and left end sides of the screen. The liquid crystal display device is formed as described above.

Examples of the first driving circuit 31, the second driving circuit 32, the timing control circuit 70, and a buffer 80 will be described below. The following examples are described only as examples, and these components are not limited to the following examples.

FIG. 24 is a circuit diagram in which the first driving circuit 31 is partially enlarged.

As illustrated in FIGS. 24 and 19, the first driving circuit 31 includes an order circuit 71, plural auxiliary capacitive power supply selecting circuits 31a, plural buffers 73, and plural buffers 74. The order circuit 71 includes n shift registers 72 as many as the scanning lines G. The buffers 73 are connected to the plural (4L−1)th-row and 4Lth-row scanning lines G. The buffer 73 is connected to the shift register 72 on a one-on-one level. Therefore, the first driving circuit 31 can sequentially provide the scanning signal to the plural (4L−1)th-row and 4Lth-row scanning lines G via the buffers 73.

A first auxiliary capacitive voltage supply line w3 and a second auxiliary capacitive voltage supply line w4 extend in the first driving circuit 31 to form the first driving circuit 31. On one end side, the first auxiliary capacitive voltage supply line w3 and the second auxiliary capacitive voltage supply line w4 are located out of the first driving circuit 31, and connected to pads p3 and p4. An auxiliary capacitive voltage Vc1 is supplied to the first auxiliary capacitive voltage supply line w3 via the pad p3. An auxiliary capacitive voltage Vc2 is supplied to the second auxiliary capacitive voltage supply line w4 via the pad p4.

The auxiliary capacitive power supply selecting circuits 31a are provided according to the plural (4L−1)th-row and 4Lth-row auxiliary capacitive lines C. Each of the auxiliary capacitive power supply selecting circuits 31a includes an NMOS transistor 75 that selects whether the auxiliary capacitive voltage Vc1 is provided to the (4L−1)th-row and 4Lth-row auxiliary capacitive lines C and a PMOS transistor 76 that selects whether the auxiliary capacitive voltage Vc2 is provided to the (4L−1)th-row and 4Lth-row auxiliary capacitive lines C. ON/OFF of the NMOS transistor 75 and the PMOS transistor 76 is switched based on the polarity inversion control signal from the shift register 72.

The auxiliary capacitive power supply selecting circuits 31a are connected to the (4L−1)th-row and 4Lth-row auxiliary capacitive lines C via the buffers 74, respectively. The first driving circuit 31 sequentially and alternately provides the auxiliary capacitive voltage Vc1 and the auxiliary capacitive voltage Vc2 to the (4L−1)th-row and 4Lth-row auxiliary capacitive lines C in each frame duration.

FIG. 25 is a circuit diagram in which the second driving circuit 32 is partially enlarged.

As illustrated in FIGS. 25 and 19, the second driving circuit 32 includes an order circuit 81, plural auxiliary capacitive power supply selecting circuits 32a, plural buffers 83, and plural buffers 84. The order circuit 81 includes n shift registers 82 as many as the scanning lines G. The buffers 83 are connected to the plural (4L−3)th-row and (4L−2)th-row scanning lines G. The buffer 83 is connected to the shift register 82 on a one-on-one level. Therefore, the second driving circuit 32 can sequentially provide the scanning signal to the plural (4L−3)th-row and (4L−2)th-row scanning lines G via the buffers 83.

A first auxiliary capacitive voltage supply line w5 and a second auxiliary capacitive voltage supply line w6 extend in the second driving circuit 32 to form the second driving circuit 32. On one end side, the first auxiliary capacitive voltage supply line w5 and the second auxiliary capacitive voltage supply line w6 are located out of the second driving circuit 32, and connected to pads p5 and p6. The auxiliary capacitive voltage Vc1 is supplied to the first auxiliary capacitive voltage supply line w5 via the pad p5. The auxiliary capacitive voltage Vc2 is supplied to the second auxiliary capacitive voltage supply line w6 via the pad p6.

The auxiliary capacitive power supply selecting circuits 32a are provided according to the plural (4L−3)th-row and (4L−2)th-row auxiliary capacitive lines C. Each of the auxiliary capacitive power supply selecting circuits 32a includes an NMOS transistor 85 that selects whether the auxiliary capacitive voltage Vc1 is provided to the (4L−3)th-row and (4L−2)th-row auxiliary capacitive lines C and a PMOS transistor 86 that selects whether the auxiliary capacitive voltage Vc2 is provided to the (4L−3)th-row and (4L−2)th-row auxiliary capacitive lines C. ON/OFF of the NMOS transistor 85 and the PMOS transistor 86 is switched based on the polarity inversion control signal from the shift register 82.

The auxiliary capacitive power supply selecting circuits 32a are connected to the (4L−3)th-row and (4L−2)th-row auxiliary capacitive lines C via the buffers 84, respectively. The second driving circuit 32 sequentially and alternately provides the auxiliary capacitive voltage Vc1 and the auxiliary capacitive voltage Vc2 to the (4L−3)th-row and (4L−2)th-row auxiliary capacitive lines C in each frame duration.

As illustrated in FIG. 19, and FIGS. 24 and 25, the timing control circuit 70 is formed by combining a frequency-dividing circuit and a three-stage shift register. The timing control circuit 70 generates a first synchronizing signal CLK1 and a second synchronizing signal CLK2, which have phases different from each other, by inputting the first control signal Con1 and the second control signal Con2. Compared with the first synchronizing signal CLK1, the phase of the second synchronizing signal CLK2 is deviated by two horizontal scanning periods. The timing control circuit 70 provides the first synchronizing signal CLK1 to the first driving circuit 31 via the buffer 80, and provides the second synchronizing signal CLK2 to the second driving circuit 32 via the buffer 80.

Therefore, the first driving circuit 31 and the second driving circuit 32 can sequentially provide the scanning signal to the plural scanning lines G in each row in the case that the first synchronizing signal CLK1 is provided to the first driving circuit 31 while the second synchronizing signal CLK2 is provided to the second driving circuit 32.

In this case, the first driving circuit 31 and the second driving circuit 32 can sequentially provide the first auxiliary capacitive voltage Vc1 or the second auxiliary capacitive voltage Vc2 to the plural auxiliary capacitive lines C in each row.

According to the liquid crystal display device of the second embodiment having the above configuration, the liquid crystal display device includes the array substrate AR, the counter substrate CT, the liquid crystal layer LQ, the plural pixels PX, the first driving circuit 31, the second driving circuit 32, and the timing control circuit 70. In the liquid crystal display device of the second embodiment, the image-burn phenomenon can be suppressed because the CC driving and the polarity inversion driving are used. The CC driving is used from the viewpoint of reducing the power consumption.

During the kth frame duration, under the control of the timing control circuit 70, the first driving circuit 31 outputs the scanning signal to the (4L−1)th-row and 4Lth-row scanning lines G, and the second driving circuit 32 outputs the scanning signal to the (4L−3)th-row and (4L−2)th-row scanning line G.

During the (k+1)th frame duration, under the control of the timing control circuit 70, the first driving circuit 31 outputs the scanning signal to the plural (4L−1)th-row and 4Lth-row scanning lines G, and the second driving circuit 32 outputs the scanning signal to the plural (4L−3)th-row and (4L−2)th-row scanning lines G.

As described above, in the case that the pixel has the positive polarity in one frame duration, the liquid crystal display device switches the auxiliary capacitive voltage from the auxiliary capacitive voltage Vc2 to the auxiliary capacitive voltage Vc1 during the pixel retention period. As a result, the pixel retention voltage polarity becomes positive. Similarly, the auxiliary capacitive voltage is switched from the first auxiliary capacitive voltage Vc1 to the second auxiliary capacitive voltage Vc2 during the pixel retention period when the pixel has the negative polarity. As a result, the pixel retention voltage polarity becomes negative. The CC driving can be performed while the voltage provided to the auxiliary capacitive line C is switched during the pixel retention period, so that the amplitude (the voltage value) of the video signal provided to the signal line S can be reduced. Therefore, for example, the power consumption of the liquid crystal display device can be reduced.

While the CC driving is performed, first driving circuit 31 outputs the scanning signal to the (4L−1)th-row and 4Lth-row scanning lines G, and the second driving circuit 32 outputs the scanning signal to the (4L−3)th-row and (4L−2)th-row scanning lines G. Therefore, the retention potential at the pixel PX in the unit of four rows becomes identical between the consecutive frames. Accordingly, the generation of the flicker can be reduced in the halftone raster display. If the pixel pitch (pixel pitch in the column direction Y) may be narrow, a length of four rows in the column direction Y is minimal, so that the generation of the horizontal streak can be suppressed.

As illustrated in FIGS. 24 and 25, the first driving circuit 31 and the second driving circuit 32 are formed, which allows the potential at the auxiliary capacitive line C to be switched to the desired value in each frame duration by driving the first driving circuit 31 and the second driving circuit 32.

During the kth frame duration, under the control of the timing control circuit 70, the first driving circuit 31 provides the first auxiliary capacitive voltage to the (4L−1)th-row auxiliary capacitive line C and provides the second auxiliary capacitive voltage to the 4Lth-row scanning line G, and the second driving circuit 32 provides the first auxiliary capacitive voltage to the (4L−3)th-row auxiliary capacitive line C and provides the second auxiliary capacitive voltage to the (4L−2)th-row auxiliary capacitive line C.

During the (k+1)th frame duration, under the control of the timing control circuit 70, the first driving circuit 31 provides the second auxiliary capacitive voltage to the (4L−1)th-row auxiliary capacitive line C and provides the first auxiliary capacitive voltage to the 4Lth-row scanning line G, and the second driving circuit 32 provides the second auxiliary capacitive voltage to the (4L−3)th-row auxiliary capacitive line C and provides the first auxiliary capacitive voltage to the (4L−2)th-row auxiliary capacitive line C.

Additionally, the same effect as the liquid crystal display device of the first embodiment can be obtained in the liquid crystal display device of the second embodiment.

As described above, the excellent-display-quality liquid crystal display device, in which the power consumption is reduced, the generation of the flicker is reduced, and the image-burn phenomenon is suppressed, can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the locations of the first driving circuit 31 (the first switching circuit 41) and the second driving circuit 32 (the second switching circuit 42) may be reversed.

In the embodiments, by way of example, the initial orientation direction of the liquid crystal molecule LM is parallel to the column direction Y. Alternatively, as illustrated in FIG. 4, the initial orientation direction of the liquid crystal molecule LM may be the oblique direction D that obliquely intersects the column direction Y. At this point, an angle θ1 formed between the initial orientation direction D and the column direction Y is greater than 0° and less than 45°. The angle θ1 ranges from about 5° to about 30°, and is more desirably less than or equal to 20° from the viewpoint of the orientation control of the liquid crystal molecule LM. That is, desirably the initial orientation direction of the liquid crystal molecule LM is substantially parallel to the direction that ranges from 0° to 20° with respect to the column direction Y.

In the embodiments, the liquid crystal layer LQ is made of the liquid crystal material having the positive (positive type) dielectric anisotropy. Alternatively, the liquid crystal layer LQ may be made of a liquid crystal material having a negative dielectric anisotropy, namely, an n-type liquid crystal. In this case, when at least the pixel electrode PE includes a secondary pixel electrode that is formed while extending in the row direction X, both a polar angle and an azimuth angle can be defined by the electric field, and an orientation regulating force of the liquid crystal molecule can be strengthened. Therefore, generation of pooling can be suppressed. But, although the detailed description is omitted, because the dielectric anisotropy is inverted, the angle θ1 ranges from 45° to 90°, and is desirably greater than or equal to 70° for the n-type liquid crystal.

The structure of the pixel PX is not limited to the example in FIG. 4, and various modifications can be made.

Figure 26:
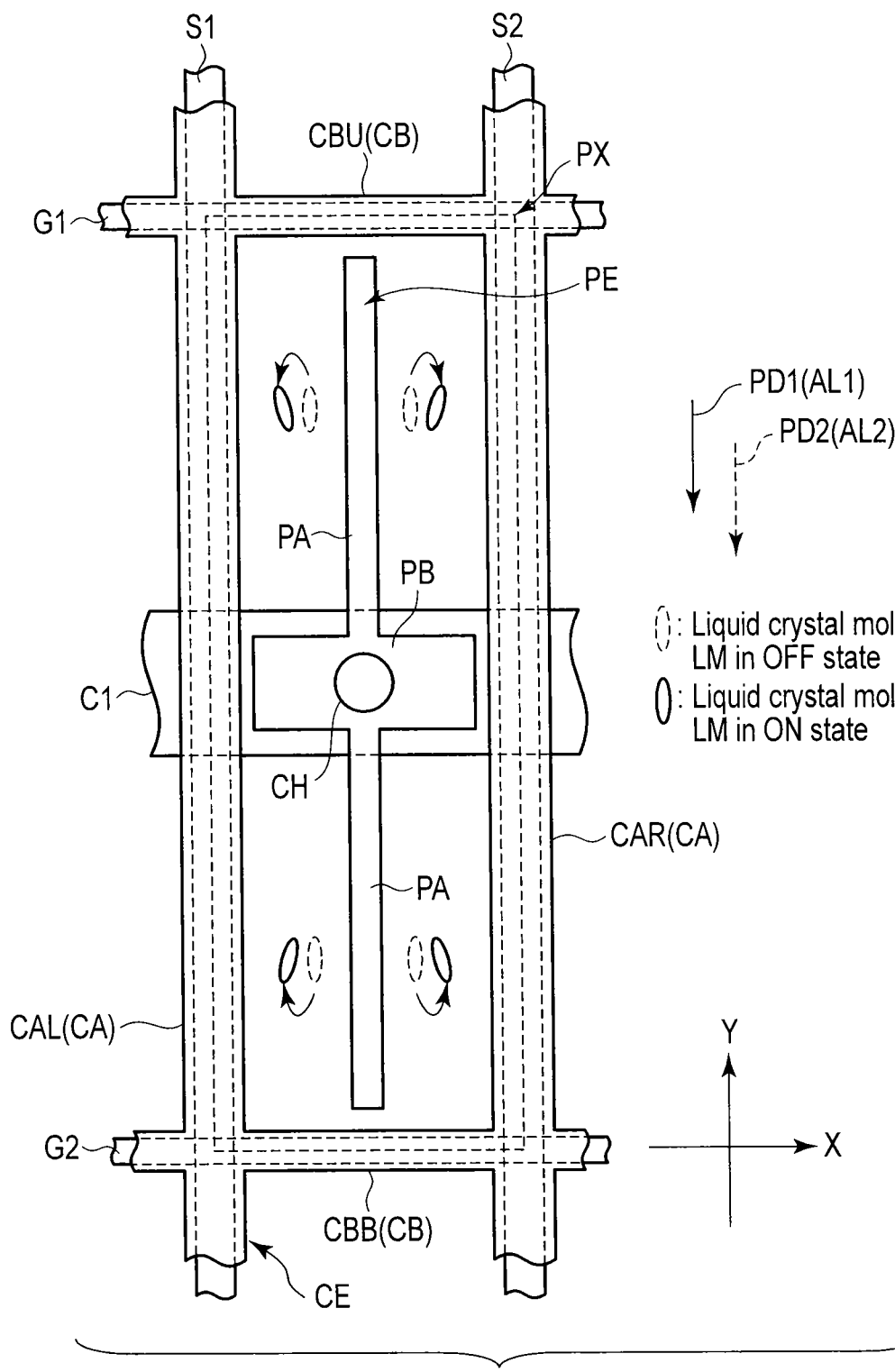
FIG. 26 is a view illustrating a modification of the structural example of the pixel in FIG. 4, and is a plan view schematically illustrating another structural example of a pixel when the liquid crystal display panel is viewed from the counter substrate side.

FIG. 26 is a view illustrating a modification of the structural example of the pixel PX in FIG. 4, and is a plan view schematically illustrating another structural example of a pixel PX when the liquid crystal display panel LPN is viewed from the side of the counter substrate CT.

The structural example in FIG. 26 differs from the structural example in FIG. 4 in that the pixel electrode PE is formed into a cross shape and that the common electrode CE is formed into a lattice shape so as to surround one pixel PX.

That is, the pixel electrode PE includes a primary pixel electrode PA and a secondary pixel electrode PB, which are electrically connected to each other. The primary pixel electrode PA has a lengthwise direction in the column direction Y, and extends linearly in the column direction Y from the secondary pixel electrode PB to the neighborhoods in the upper and lower end portions of the pixel PX. The secondary pixel electrode PB extends in the row direction X. The sub-pixel electrode PB is located in the region facing the auxiliary capacitive line C1, and is electrically connected to the switching element through the contact hole CH. In the example in FIG. 26, the secondary pixel electrode PB is provided in the substantial center of the pixel PX, and the pixel electrode PE is formed into the cross shape.

In addition to the primary common electrode CA, the common electrode CE includes a pair of secondary common electrodes CB, which are located while the secondary pixel electrode PB is sandwiched therebetween in the row direction Y and extends in the row direction X. The secondary common electrode CB is provided in the counter substrate CT. The primary common electrode CA and the secondary common electrode CB are integrally or continuously formed. The secondary common electrode CB faces each of the scanning lines G. In the example in FIG. 26, the two secondary common electrodes CB are disposed in parallel to each other in the row direction X. Hereinafter, in order to distinguish the secondary common electrodes CB from each other, the upper secondary common electrode is referred to as a CBU, and the lower secondary common electrode is referred to as a CBB. The secondary common electrode CBU is disposed in the upper end portion of the pixel PX, and faces the scanning line G1. That is, the secondary common electrode CBU is disposed across the boundary between the pixel PX and the adjacent pixel on the upper side. The secondary common electrode CBB is disposed in the lower end portion of the pixel PX, and faces the scanning line G2. That is, the secondary common electrode CBB is disposed across the boundary between the pixel PX and the adjacent pixel on the lower side.

As to the positional relationship between the pixel electrode PE and the common electrode CE, the primary pixel electrodes PA and the primary common electrodes CA are alternately disposed in the row direction X, and the secondary pixel electrodes PB and the secondary common electrodes CB are alternately disposed in the column direction Y. That is, one primary pixel electrode PA is located between the primary common electrodes CAL and CAR adjacent to each other, and the primary common electrode CAL, the primary pixel electrode PA, and the primary common electrode CAR are sequentially arrayed in the row direction X. One secondary pixel electrode PB is located between the secondary common electrodes CBB and CBU adjacent to each other, and the secondary common electrode CBB, the secondary pixel electrode PB, and the secondary common electrode CBU are sequentially arrayed in the column direction Y. The liquid crystal layer LQ is made of the p-type liquid crystal.

According to the structural example in FIG. 26, the liquid crystal molecule LM that is initially oriented toward the column direction Y in the OFF state is influenced by the electric field formed between the pixel electrode PE and the common electrode CE in the ON state, and the long axis of the liquid crystal molecule LM rotates in the plane substantially parallel to the X-Y plane as indicated by the solid line in FIG. 26. The liquid crystal molecule LM in the region surrounded by the pixel electrode PE, the primary common electrode CAL, and the secondary common electrode CBB rotates clockwise with respect to the column direction Y and is oriented toward the lower left in FIG. 26. The liquid crystal molecule LM in the region surrounded by the pixel electrode PE, the primary common electrode CAR, and the secondary common electrode CBB rotates counterclockwise with respect to the column direction Y and is oriented toward the lower right in FIG. 26. The liquid crystal molecule LM in the region surrounded by the pixel electrode PE, the primary common electrode CAL, and the secondary common electrode CBU rotates counterclockwise with respect to the column direction Y and is oriented toward the upper left in FIG. 26. The liquid crystal molecule LM in the region surrounded by the pixel electrode PE, the primary common electrode CAR, and the secondary common electrode CBU rotates clockwise with respect to the column direction Y and is oriented toward the upper right in FIG. 26.

In each pixel PX, in the state in which the electric field is formed between the pixel electrode PE and the common electrode CE, more domains can be formed than in the example in FIG. 4, the view angle can be enlarged, and the orientation regulating force of the liquid crystal molecule can be strengthened more than that of the example in FIG. 4.

In the configuration of the pixel PX in FIG. 26, the liquid crystal layer LQ may be made of the n-type liquid crystal. In this case, a sufficiently strong orientation regulating force of the liquid crystal molecule can be obtained.

The common electrode CE may further include an electrode. The description will be made by taking the pixel PX in FIGS. 4 and 5 as an example. In addition to the primary common electrode CA included in the counter substrate CT, the common electrode CE may include a second primary common electrode (a shielding electrode) that faces the primary common electrode CA (or the signal line S) included in the array substrate AR. The second primary common electrode extends substantially in parallel to the primary common electrode CA and has the same potential as the primary common electrode CA. The common electrode CE can be shielded from the undesired electric field of the signal line S by providing the second primary common electrode.

In addition to the primary common electrode CA included in the counter substrate CT, the common electrode CE may include a second secondary common electrode (a shielding electrode) that is included in the array substrate AR to face the scanning line G and the auxiliary capacitive line C. The second secondary common electrode extends in the direction intersecting the primary common electrode CA, and has the same potential as the primary common electrode CA. The common electrode CE can be shielded from the undesired electric fields of the scanning line G and the auxiliary capacitive line C by providing the second secondary common electrode. According to the configuration in which the second primary common electrode and the second secondary common electrode are provided, the degradation of the display quality can further be suppressed.

In the liquid crystal display device of the embodiments, the transverse electric field mode or the oblique electric field mode is used utilising a technique different from the IPS (In-Plane Switching) mode. The display mode of the liquid crystal display device is not limited to the embodiments, and various modifications can be made. For example, an MVA (Multi-domain Vertically Aligned) mode, an FFS (Fringe Field Switching) mode, and a TN (Twisted Nematic) mode can be used in the liquid crystal display device. In this case, the above effect can be obtained.

FIG. 27 is a sectional view schematically illustrating a liquid crystal display device according to a modification of the first and second embodiments. As illustrated in FIG. 27, the liquid crystal display device may include a liquid crystal display panel LPN, a sensing substrate 30, a protective plate 40, and bonding materials 50 and 60. The liquid crystal display panel LPN is one of the liquid crystal display panels LPN of the first and second embodiments. In this case, the liquid crystal display panel LPN is formed like the liquid crystal display panel LPN of the first embodiment.

The sensing substrate 30 faces the display surface of the liquid crystal display panel LPN. The sensing substrate 30 includes an input area R3 facing a display area R1. The sensing substrate 30 acts as a touch panel, and detects positional information on the point input to the input area R3.

The bonding material 50 bonds the liquid crystal display panel LPN and the sensing substrate 30 together. The protective plate 40 faces the sensing substrate 30. The protective plate 40 acts as decoration for an input surface side (the surface side of the liquid crystal display panel LPN) of the sensing substrate 30, and affects the appearance of the liquid crystal display device. The protective plate 40 is of a flat type, and is made of transparent insulating materials, such as glass and an acrylic resin. The bonding material 60 bonds the sensing substrate 30 and the protective plate 40 together.

For example, an electrostatic capacity system and a resistance pressure-sensitive system can be used as a position detecting system of the sensing substrate 30. A finger of an operator and a conductor can be cited as an example of input means 200, and the input means 200 may be selected according to the position detecting system. In any system, undesired noise acting on the sensing substrate 30 from the liquid crystal display panel LPN is desirably reduced.

As described above, because the CC driving is used in the liquid crystal display device, the amplitude (the voltage value) of the video signal provided to the signal line S can be reduced, namely, a variation in potential of the video signal can be suppressed compared with the case that the CC driving is not used. The undesired noise acting on the sensing substrate 30 from the liquid crystal display panel LPN is reduced by suppressing the variation in potential of the video signal, so that the degradation of the position detecting function of the sensing substrate 30 can be suppressed.

What is claimed is:

1. A liquid crystal display device comprising:
a first substrate comprising a plurality of signal lines that extend in a column direction, a plurality of scanning lines that extend in a row direction, a plurality of switching elements that are electrically connected to the signal lines and the scanning lines, a plurality of auxiliary capacitive elements that are electrically connected to the switching elements, a plurality of auxiliary capacitive lines each of which extends in the row direction and is electrically connected to one end of the auxiliary capacitive element, a plurality of pixel electrodes each of which is electrically connected to the switching element and the other end of the auxiliary capacitive element, a first driving circuit and a second driving circuit between which the pixel electrodes are sandwiched in the row direction and which output a scanning signal, a first auxiliary capacitive voltage and a second auxiliary capacitive voltage, a first switching circuit that is connected to the first driving circuit to alternately switch between a first state and a second state every two frame durations, the first switching circuit being connected to the (2L−1)th-row scanning lines and the (2L−1)th-row auxiliary capacitive lines in the first state, the first switching circuit being connected to the 2Lth-row scanning lines and the 2Lth-row auxiliary capacitive lines in the second state, and a second switching circuit that is connected to the second driving circuit to alternately switch between the first state and the second state every two frame durations, and a signal line driving circuit that is electrically connected to the signal lines and outputs video images;
a second substrate that is arranged opposite to the first substrate with a gap;
a liquid crystal layer that is held between the first substrate and the second substrate; and
a common electrode that is formed on the first substrate or the second substrate and set to a common voltage of a constant voltage,
wherein
the first switching circuit and the second switching circuit are alternately switched between the first state and the second state in a same frame duration,
each of the first driving circuit and the second driving circuit alternately outputs the first auxiliary capacitive voltage and the second auxiliary capacitive voltage, such that the auxiliary capacitive voltage to be output varies every two frame durations, and the first driving circuit outputs one of the first and second auxiliary capacitive voltages and the second driving circuit outputs the other of the first and second auxiliary capacitive voltages in a same frame duration,
the signal line driving circuit makes a polarity of video images provided to the (2L−1)th-row pixel electrodes and a polarity of video images provided to the 2Lth-row pixel electrodes different from each other within each frame duration, and reverses each of the polarities of the video images provided to the pixel electrodes every one frame duration, to perform a polarity inversion driving, and
the first driving circuit, the second driving circuit, the first switching circuit, and the second switching circuit alternately output the first auxiliary capacitive voltage and the second auxiliary capacitive voltage to each auxiliary capacitive line every one frame duration, to perform a conductively coupled driving.

2. The liquid crystal display device according to claim 1, further comprising:
a timing control circuit that controls a time each of the first switching circuit and the second switching circuit is switched between the first state and the second state.

3. The liquid crystal display device according to claim 1, wherein the first driving circuit, the second driving circuit, the first switching circuit, and the second switching circuit sequentially provide the scanning signal to the scanning lines in each row.

4. The liquid crystal display device according to claim 1, wherein during a kth frame duration in which the first switching circuit is in the second state while the second switching circuit is in the first state, the first driving circuit outputs the scanning signal and the second auxiliary capacitive voltage and the second driving circuit outputs the scanning signal and the first auxiliary capacitive voltage, and
during a (k+1)th frame duration, the first switching circuit is switched to the first state, the second switching circuit is switched to the second state, the first driving circuit outputs the scanning signal and the second auxiliary capacitive voltage, and the second driving circuit outputs the scanning signal and the first auxiliary capacitive voltage.

5. The liquid crystal display device according to claim 4, wherein during the kth frame duration, a positive-polarity video image is provided to the (2L−1)th-row pixel electrodes, and a negative-polarity video image is provided to the 2Lth-row pixel electrodes, and
during the (k+1)th frame duration, the negative-polarity video image is provided to the (2L−1)th-row pixel electrodes, and the positive-polarity video image is provided to the 2Lth-row pixel electrodes.

6. The liquid crystal display device according to claim 4, wherein during a (k−1)th frame duration, the first switching circuit is switched to the second state, the second switching circuit is switched to the first state, the first driving circuit outputs the scanning signal and the first auxiliary capacitive voltage, and the second driving circuit outputs the scanning signal and the second auxiliary capacitive voltage, and
during a (k+2)th frame duration, the first switching circuit is maintained in the first state, the second switching circuit is maintained in the second state, the first driving circuit outputs the scanning signal and the first auxiliary capacitive voltage, and the second driving circuit outputs the scanning signal and the second auxiliary capacitive voltage.

7. The liquid crystal display device according to claim 6, wherein during the (k−1)th frame duration, the negative-polarity video image is provided to the (2L-1)th-row pixel electrodes, and the positive-polarity video image is provided to the 2Lth-row pixel electrodes,
during the kth frame duration, the positive-polarity video image is provided to the (2L−1)th-row pixel electrodes, and the negative-polarity video image is provided to the 2Lth-row pixel electrodes,
during the (k+1)th frame duration, the negative-polarity video image is provided to the (2L−1)th-row pixel electrodes, and the positive-polarity video image is provided to the 2Lth-row pixel electrodes,
during the (k+2)th frame duration, the positive-polarity video image is provided to the (2L−1)th-row pixel electrodes, and the negative-polarity video image is provided to the 2Lth-row pixel electrodes.

8. A liquid crystal display device comprising:

a first substrate comprising a plurality of signal lines that extend in a column direction, a plurality of scanning lines that extend in a row direction, a plurality of switching elements that are electrically connected to the signal lines and the scanning lines, a plurality of auxiliary capacitive elements that are electrically connected to the switching elements, a plurality of auxiliary capacitive lines each of which extends in the row direction and is electrically connected to one end of the auxiliary capacitive element, a plurality of pixel electrodes each of which is electrically connected to the switching element and the other end of the auxiliary capacitive element, a first driving circuit and a second driving circuit between which the pixel electrodes are sandwiched in the row direction and which output a scanning signal, a first auxiliary capacitive voltage and a second auxiliary capacitive voltage, a first switching circuit that is connected to the first driving circuit to alternately switch between a first state and a second state every two frame durations, the first switching circuit being connected to the (2L−1)th-row scanning lines and the (2L−1)th-row auxiliary capacitive lines in the first state, the first switching circuit being connected to the 2Lth-row scanning lines and the 2Lth-row auxiliary capacitive lines in the second state, and a second switching circuit that is connected to the second driving circuit to alternately switch between the first state and the second state every two frame duration durations, and a signal line driving circuit that is electrically connected to the signal lines and outputs video images;

a second substrate that is arranged opposite to the first substrate with a gap;

a liquid crystal layer that is held between the first substrate and the second substrate; and a common electrode that is formed on the first substrate or the second substrate and set to a common voltage of a constant voltage, wherein each of the pixel electrodes includes a primary pixel electrode that extends in the column direction, the common electrode includes a plurality of primary common electrodes, each of which is formed on the second substrate, located in the row direction while the primary pixel electrode is sandwiched therebetween, and extends in the column direction, the first switching circuit and the second switching circuit are alternately switched between the first state and the second state in a same frame duration, each of the first driving circuit and the second driving circuit alternately outputs the first auxiliary capacitive voltage and the second auxiliary capacitive voltage, such that the auxiliary capacitive voltage to be output varies every two frame durations, and the first driving circuit outputs one of the first and second auxiliary capacitive voltages and the second driving circuit outputs the other of the first and second auxiliary capacitive voltages in a same frame duration, the signal line driving circuit makes a polarity of video images provided to the (2L−1)th-row pixel electrodes and a polarity of video images provided to the 2Lth-row pixel electrodes different from each other within each frame duration, and reverses each of the polarities of the video images provided to the pixel electrodes every one frame duration, to perform a polarity inversion driving, and the first driving circuit, the second driving circuit, the first switching circuit and the second switching circuit alternately output the first auxiliary capacitive voltage and the second auxiliary capacitive voltage to each auxiliary capacitive line every one frame duration, to perform a conductively coupled driving.

9. The liquid crystal display device according to claim 8, wherein the common electrode further includes other plurality of primary common electrodes, each of which is formed on the first substrate, extends in the column direction, and is located between the primary common electrode and the signal line.

10. The liquid crystal display device according to claim 8, wherein each of the pixel electrodes further includes a secondary pixel electrode that is formed on the first substrate, connected to the primary pixel electrode, and extends in the row direction.

11. The liquid crystal display device according to claim 10, wherein the primary pixel electrode and the secondary pixel electrode intersect each other, and are formed into a cross shape.

12. The liquid crystal display device according to claim 10, wherein the common electrode further includes a plurality of secondary common electrodes, each of which is formed on the second substrate, located in the column direction while the secondary pixel electrode is sandwiched therebetween, and extends in the row direction.

13. The liquid crystal display device according to claim 12, wherein the common electrode further includes other plurality of secondary common electrodes, each of which is formed on the first substrate, extends in the row direction, and is located between the secondary common electrode and the scanning line.

* * * * *